United States Patent
Vause et al.

(10) Patent No.: US 12,326,701 B2
(45) Date of Patent: Jun. 10, 2025

(54) DETERMINISTIC INDUSTRIAL PROCESS CONTROL

(71) Applicant: Phaidra, Inc., Seattle, WA (US)

(72) Inventors: Christopher R. Vause, Austin, TX (US); Frank Nerkowski, Seattle, WA (US); Raahul Singh, Seattle, WA (US)

(73) Assignee: Phaidra, Inc., Seattle, WA (US)

( * ) Notice: Subject to any disclaimer, the term of this patent is extended or adjusted under 35 U.S.C. 154(b) by 0 days.

(21) Appl. No.: 18/770,342

(22) Filed: Jul. 11, 2024

(65) Prior Publication Data
US 2025/0021061 A1    Jan. 16, 2025

Related U.S. Application Data

(60) Provisional application No. 63/526,065, filed on Jul. 11, 2023.

(51) Int. Cl.
*G05B 13/02* (2006.01)

(52) U.S. Cl.
CPC ................. *G05B 13/0265* (2013.01)

(58) Field of Classification Search
CPC .................................................. G05B 13/0265
USPC .......................................................... 700/47
See application file for complete search history.

(56) References Cited

U.S. PATENT DOCUMENTS

| | | | |
|---|---|---|---|
| 5,454,511 A * | 10/1995 | Van Ostrand | G05D 23/1904 165/238 |
| 10,969,749 B2 * | 4/2021 | Backstrom | D21G 9/0009 |
| 11,778,030 B2 | 10/2023 | Park et al. | |
| 11,809,164 B2 | 11/2023 | Gao et al. | |
| 11,836,599 B2 | 12/2023 | Evans et al. | |
| 2018/0150039 A1 * | 5/2018 | Amrit | G05B 13/04 |
| 2018/0364654 A1 | 12/2018 | Locke et al. | |
| 2019/0236447 A1 | 8/2019 | Cohen et al. | |
| 2021/0247744 A1 * | 8/2021 | Fahrenkopf | G06N 7/01 |
| 2022/0120464 A1 * | 4/2022 | Xu | F24F 11/523 |
| 2022/0365495 A1 * | 11/2022 | Wenzel | G05B 13/041 |
| 2023/0368037 A1 * | 11/2023 | Huang | G06N 3/096 |
| 2024/0090154 A1 | 3/2024 | Harvey et al. | |
| 2024/0183556 A1 * | 6/2024 | Ohta | G06Q 50/16 |
| 2024/0265263 A1 * | 8/2024 | Moskovitz | G06N 3/091 |

OTHER PUBLICATIONS

"Deep Learning Process Control Platform", Imubit, https://imubit.com/deep-learning-process-control-platform-for-hydrocarbon-processors/, first downloaded Jun. 23, 2023.

(Continued)

*Primary Examiner* — Thomas C Lee
*Assistant Examiner* — Michael Tang
(74) *Attorney, Agent, or Firm* — Jeffrey Schox; Diana Lin

(57) ABSTRACT

In variants, a method for industrial process control can include: determining AI setpoint values using an AI agent; determining local setpoint values using a local control system; selecting a setpoint source from a set of candidate setpoint sources including the AI agent and the local control system; optionally determining a set of transition setpoint values based on setpoints provided by the setpoint source; and limiting the setpoint values; wherein the industrial system is operated based on the limited setpoint values.

20 Claims, 9 Drawing Sheets

(56) References Cited

OTHER PUBLICATIONS

Evans, Richard, et al., "DeepMind AI Reduces Google Data Centre Cooling Bill by 40%", Jul. 20, 2016, https://www.deepmind.com/blog/deepmind-ai-reduces-google-data-centre-cooling-bill-by-40.
Gamble, Gao, et al., "Safety-first AI for autonomous data centre cooling and industrial control", https://www.deepmind.com/blog/safety-first-ai-for-autonomous-data-centre-cooling-and-industrial-control, Aug. 17, 2018.
Luo, Jerry, et al., "Controlling Commercial Cooling Systems Using Reinforcement Learning", DeepMind, Dec. 15, 2022, arXiv:2211.07357v2.
Silver, David, et al., "Mastering the game of Go with deep neural networks and tree search", Nature, vol. 529, Jan. 28, 2016.

* cited by examiner

| Component | Setpoint | Constraint |
|---|---|---|
| Component1 | Setpoint1 | Constraint1 |
|  | Setpoint2 | Constraint2 |
| Component2 | Setpoint3 | Constraint3 |
|  | ⋮ |  |

FIGURE 6A

| Component | Constraint | Min | Max | Rate of change | Min-max increment | Max - min increment |
|---|---|---|---|---|---|---|
| Chilled water system | Chilled water distribution supply temperature allowed | 42 | 44 | 2°F/ 60 min | 1-1 steps | 1-2 steps |
|  | Chilled water differential pressure allowed | 2 | 18 | 4psid / 60 min | 1-4 steps | 1-2 steps |
|  | Chilled water delta temperature | 10 | 14 | 3°F/ 60 min | 1-4 steps | 1-2 steps |
|  | ⋮ |  |  | ⋮ |  |  |

FIGURE 6B

DETERMINISTIC INDUSTRIAL PROCESS CONTROL

CROSS-REFERENCE TO RELATED APPLICATIONS

This application claims the benefit of U.S. Provisional Application No. 63/526,065 filed 11 Jul. 2023, each of which is incorporated in its entirety by this reference.

TECHNICAL FIELD

This invention relates generally to the industrial process field, and more specifically to a new and useful industrial process control system in the industrial process field.

BACKGROUND

Industrial systems are conventionally controlled using hardcoded rulesets or mathematical models (e.g., PID control, PC, fuzzy logic control, cascade control, etc.). However, because these systems are hardcoded, they do not learn or improve over time; their performance is limited by the accuracy of the models, how the models are tuned, and by the creativity of the operator that set up the system. While AI-based control systems can theoretically be used to predict the control parameters (e.g., component setpoints), this can be unsafe, since AI-based control systems are nondeterministic and can recommend unpredictable, undesirable, and potentially dangerous recommended actions, which is extremely problematic for mission-critical industrial systems (e.g., data centers, power plants, manufacturing plants, etc.), which oftentimes require deterministic, explainable actions that can be predicted with a high degree of certainty.

Furthermore, local AI-based control systems are incredibly difficult to manage, maintain, and improve since they require AI engineers to travel and develop onsite, while remote AI-based control systems can suffer from network issues (e.g., network outages, latency issues, etc.), which would leave the industrial system without any control instructions in the interim.

Thus, there is a need in the industrial process control field to create a new and useful safety architecture to enable industrial systems to use AI-based control systems.

BRIEF DESCRIPTION OF THE FIGURES

FIG. 6A is a schematic representation of a variant of a set of constraints.

FIG. 6B is an illustrative example of a set of constraints.

DETAILED DESCRIPTION

The following description of the embodiments of the invention is not intended to limit the invention to these embodiments, but rather to enable any person skilled in the art to make and use this invention.

1. Overview

Figure 4:
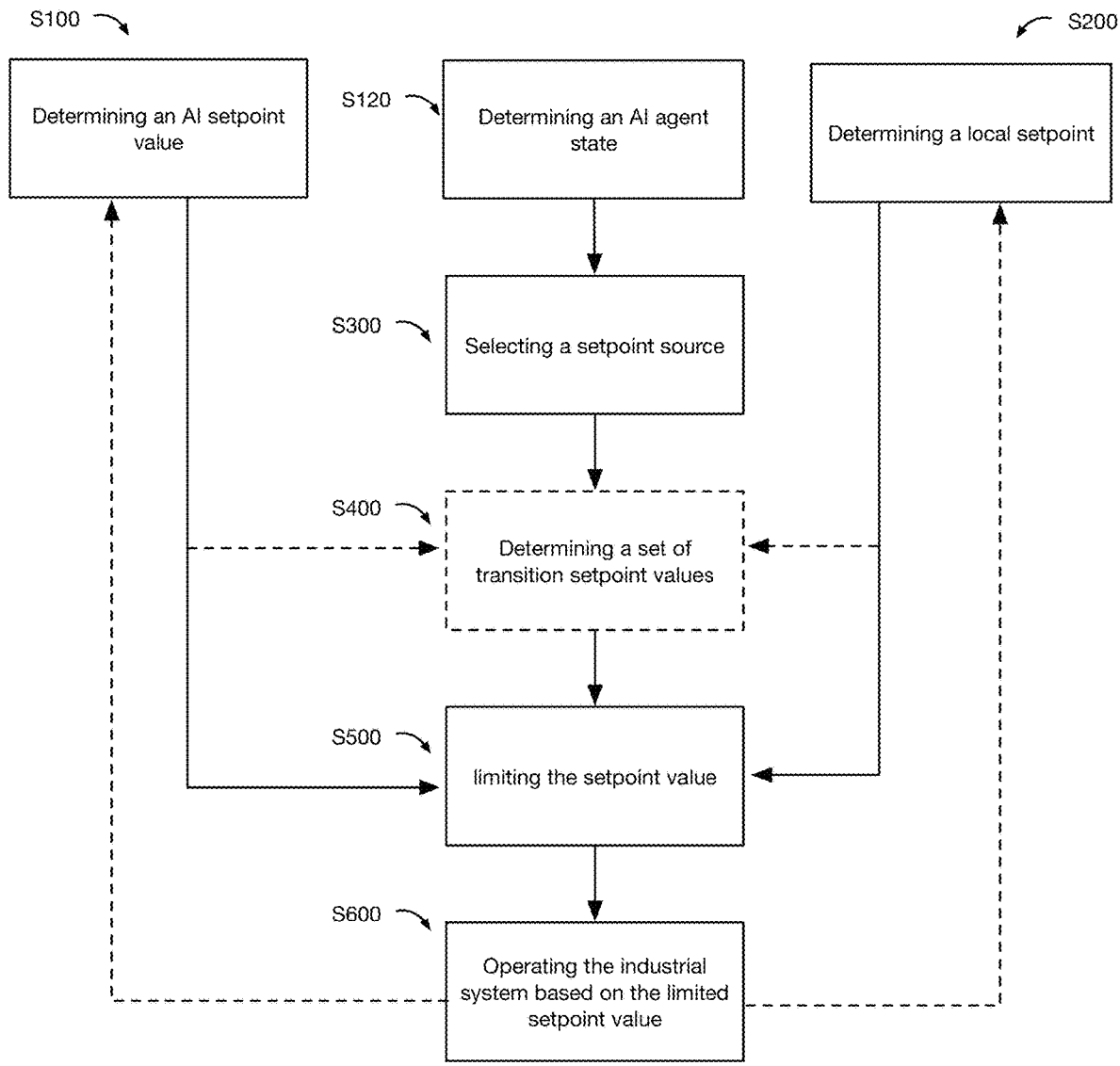
FIG. 4 is a schematic representation of a variant of the method.

In variants, as shown in FIG. 4, the method for industrial process control can include: determining AI setpoint values S100; determining local setpoint values S200; selecting a setpoint source S300; optionally determining a set of transition setpoint values S400; and limiting the setpoint values S500; wherein the industrial system is operated based on the limited setpoint values S600. The method functions to ensure that the effective setpoints (setpoint values) —used for industrial system control—are explainable and within the defined safety boundaries for said industrial system.

In an illustrative example, the method can determine AI setpoint values (AI-derived setpoint values, agent setpoint values) for the setpoints of a set of industrial system subsystems using an artificial intelligence (AI) agent (e.g., reinforcement learning agent), subject to a set of industrial system constraints, while a legacy local control system (e.g., BMS, SCADA, PLC, etc.) concurrently determines local setpoint values for the same set of industrial system subsystem setpoints. The AI agent can also determine an AI agent state. A setpoint source selector, locally executing on the industrial system, can select which setpoint source to use (e.g., whether to use the local control system or the AI agent) based on the AI agent state and/or the industrial system state, which can be different from the AI setpoint values and the local setpoint values, respectively. For example, the setpoint source selector can select the AI agent as the controlling setpoint source when the AI agent state is stable (e.g., without evaluating the AI setpoint values), and fall back on the local control system otherwise. The setpoint values from the controlling setpoint source are then used for industrial system control.

In variants, when a new setpoint source is selected, a transition module, locally executing on the industrial system, can optionally smooth out the setpoint value transition by determining a set of transitory setpoint values spanning the prior setpoint values and the new setpoint values, and can optionally determine the order in which the setpoints should be transitioned. A limit module, locally executing on the industrial system, can then verify that the setpoint values (e.g., determined by the controlling setpoint source, transitory setpoints, etc.) satisfy a second set of safety criteria before being used for industrial system control. The verified setpoint values (limited values) can then be sent to the control loop(s) of the industrial system (e.g., the legacy control loop and/or control methodology), which controls components of the industrial system to achieve the verified setpoint values. Examples are shown in FIG. 2, FIG. 3, FIG. 4, and FIG. 7.

However, safety boundaries for an AI-based process control system can be otherwise maintained.

2. Technical Advantages

Variants of the technology can confer one or more advantages over conventional technologies.

First, variants of the technology provide a multi-layered approach for ensuring that the control actions (e.g., setpoint values) are within the safety boundaries of the industrial system, even when using AI agents to recommend control actions. This can be particularly important for safety-critical systems where a failure or malfunction could lead to serious consequences (e.g., loss of life, loss of property, environmental harm, systemic effects, etc.), and/or in systems where there is little or no ability to restore the system if a constraint is violated.

In examples, a first layer (e.g., first safety layer) can be the AI agent itself, wherein AI agent action prediction is constrained using a set of constraints (e.g., hard and soft constraints, predictive constraints, thresholded constraints, etc.). In a specific example, the AI agent can be a constrained reinforcement learning agent, wherein the feasible set of actions (e.g., candidate setpoint values) for each setpoint can be constrained by a set of industrial system constraints. The constraints can be on: the setpoint values themselves, the predicted result of using the candidate setpoint value (e.g., predicted using a learned environment model of the industrial system), and/or on other datum.

In examples, a second layer (e.g., second safety layer) can include a setpoint source selector that selects which setpoint source to use, based on the overall state of the AI agent and/or industrial system. In variants, the setpoint source is not selected based on the setpoint values themselves. This enables the technology to determine whether the setpoint source as a whole can be trusted, which increases the safety of the system (e.g., setpoint values from untrusted sources should not be used) and decreases the latency of the system (e.g., the entire setpoint value set can be used or discarded without evaluating each—or any—setpoint value within the AI-determined set). Furthermore, this second layer can deal with more complex requirements that the first layer cannot easily accommodate, such as rapid industrial system changes or network issues (e.g., network outages).

In examples, a third layer (e.g., third safety layer) can include a limit module that verifies that the setpoint values are within a second set of constraints (e.g., satisfy safety criteria, ranges, boundaries, thresholds, etc.), which functions as a final check on the setpoint values, especially in variants where the setpoint source selector does not evaluate the setpoint values themselves. However, other safety layers can be added.

Second, in variants, additional benefits can be conferred by having the AI agent determine the AI agent state. First, the AI agent can determine a more accurate state due to the higher fidelity information it has about its operational state. Second, having the AI agent determine its state can reduce the size of the data packet and/or reduce the amount of consumed bandwidth, since raw data about the AI agent no longer needs to be transmitted to the local system. Third, the AI agent can determine a single classification of its state, which improves setpoint source selection by reducing the analysis down to a single-value evaluation. Fourth, the AI agent can improve setpoint value implementation latency by determining and sending its state alongside the setpoint values, thereby removing latency introduced by determining the agent state after setpoint value receipt. However, having the AI agent determine its own state can confer other benefits.

Third, variants of the technology can preserve and utilize the industrial systems' local systems (e.g., legacy systems) instead of replacing them, which reduces the overall risk by using prevalidated and pretested control systems. Variants of the technology can do this in one or more ways. First, variants of the technology can preserve the local control system (e.g., legacy control system) as a failover action source (e.g., failover setpoint source), which ensures a deterministic, explainable fallback control method if the AI agent fails. This ensures that the industrial system can be continuously operated, instead of requiring system operation to be halted while an alert is being resolved or continuing to operate the industrial system in a potentially dangerous state. Second, variants of the technology can manipulate the only setpoints of the overall industrial (sub) systems, and rely on the local control loops (e.g., legacy control loops) to maintain granular control over each piece of equipment (e.g., not include any new equipment control modules). This ensures responsive failure recovery, runtime equalization, and control loop tuning and/or accuracy, and maintains most of the core functionality of the sequence of operations in place. With this methodology, operators can remain confident in the industrial system's behavior and responsiveness. Furthermore, by preserving the legacy control mechanisms, the technology can be deployed much faster than conventional systems, since no new control loops need to be validated.

However, further advantages can be provided by the system and method disclosed herein.

3. System

Figure 1:
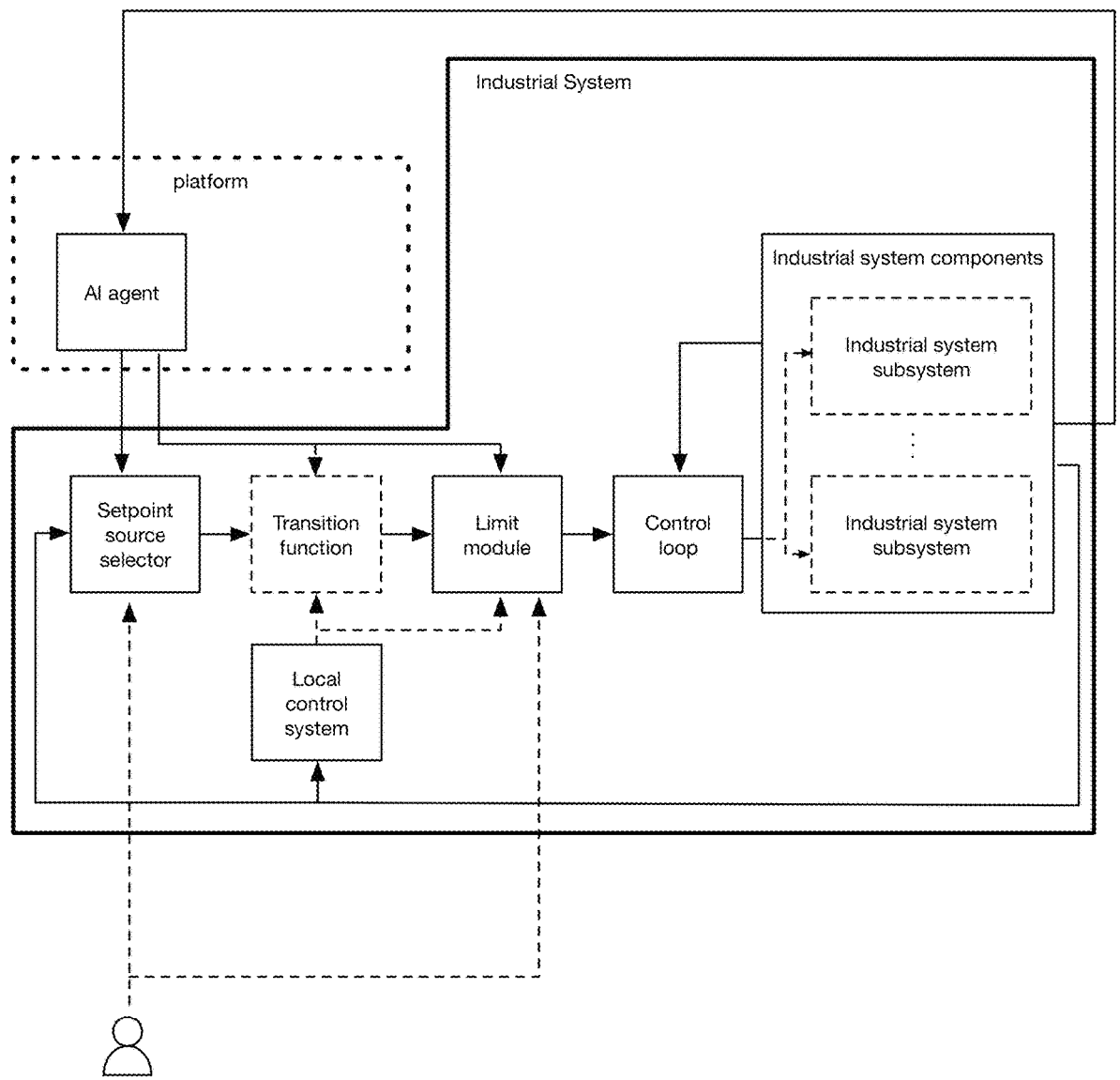
FIG. 1 is a schematic representation of a variant of the system.
Figure 2:
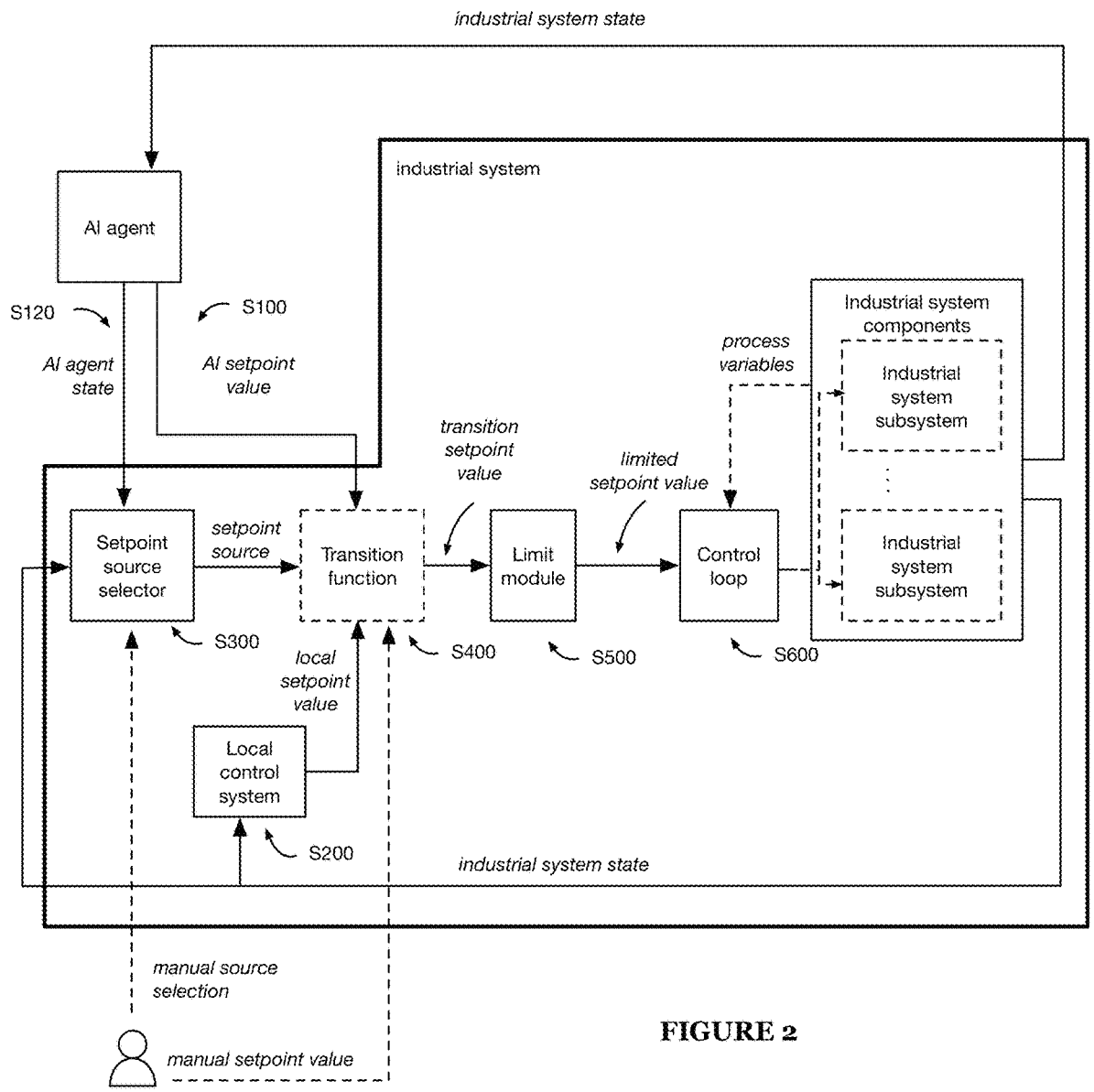
FIG. 2 is a schematic representation of an example of the system, wherein the setpoint source selector selects setpoint sources.
Figure 3:
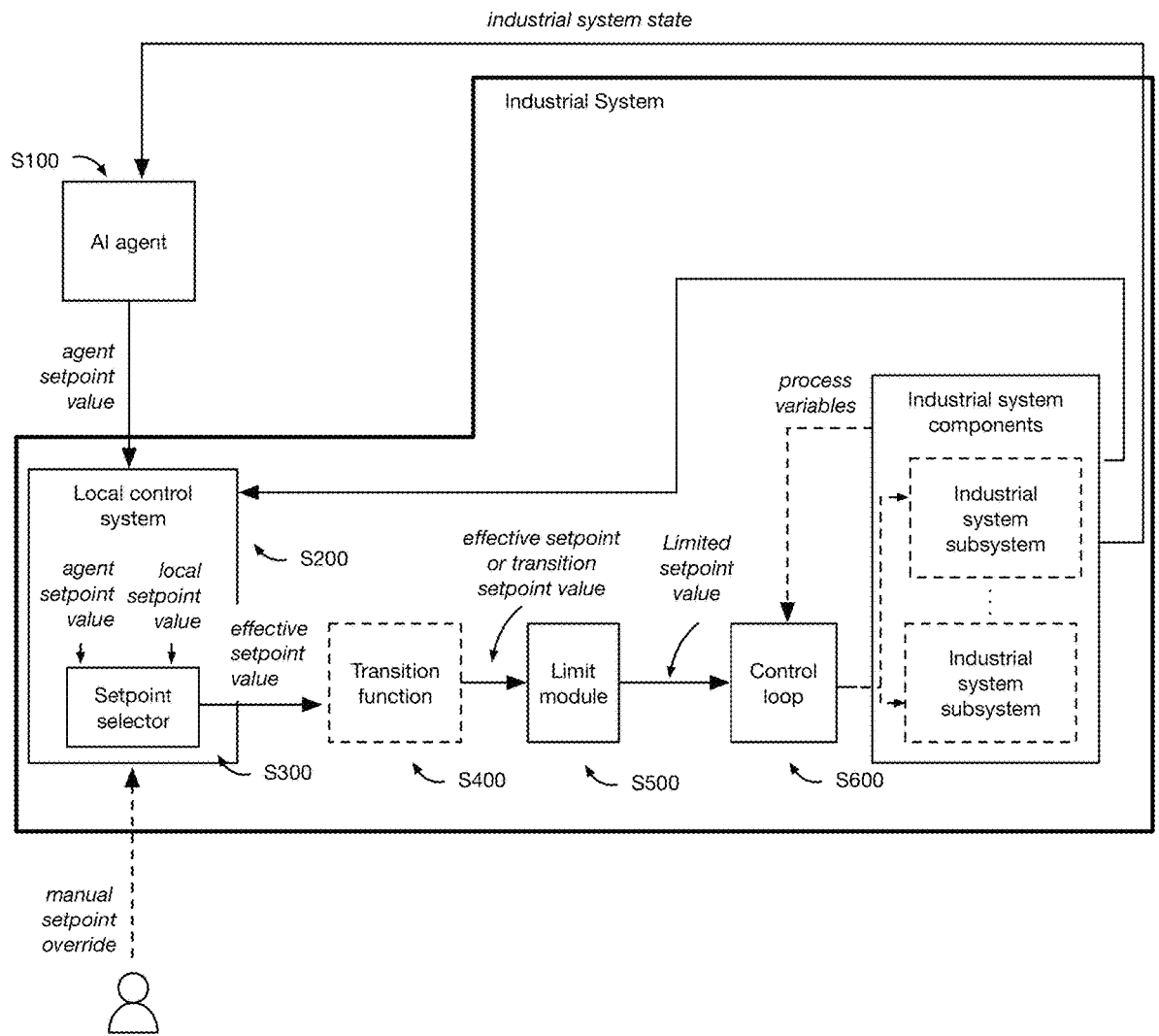
FIG. 3 is a schematic representation of an example of the system, wherein the setpoint source selector selects effective setpoints.

In variants, the system for industrial system control can include one or more: AI agents, setpoint source selectors, transition modules, limit modules, and/or any other suitable component. The system can be used with one or more industrial systems, which can include one or more: physical components, local control systems, control loops, and/or other component. Examples of the system are shown in FIG. 1, FIG. 2, and FIG. 3.

The system functions to enable an industrial system to remain within its safety boundaries while using an AI agent to determine component actions. AI agents can be desirable for industrial system control because they can dynamically adapt to component and overall system degradation (e.g., instead of periodic updates, as in conventional systems), and because they can improve system performance. In an example, an AI agent was shown to more than double the energy efficiency of a data center (e.g., from 12% to 30%).

The AI agent functions to determine a best action for industrial system operation. The best action can be: an action that optimizes a performance metric for a given timeframe (e.g., the current timeframe, the next several hours, the next several days, the next several months, etc.), an action that achieves a target performance metric value within a given timeframe, an action that minimizes a cost (e.g., defined by a cost function), an action that maximizes a reward (e.g., determined by a reward function), and/or be otherwise defined. Examples of performance metrics that can be used include: power consumption, energy consumption, waste mass or volume (e.g., pollutants, waste heat, waste products, etc.), kinematics thereof (e.g., rate, velocity, acceleration, directionality, etc.), and/or other performance metrics.

In variants, the AI agents can also function to explore the action space to: discover new rewards (e.g., new setpoint value combinations that result in better performance); learn the environment's dynamics (e.g., learn a model for the industrial system); improve the policy; improve the planner (e.g., when the AI agent includes a planner); generate better action space coverage for training (e.g., generate a better distribution of training data); and/or to otherwise improve the AI agent.

The action can be for: a single timestep, multiple timesteps, the upcoming timestep, a timestep that is a predetermined number of timesteps into the future; and/or any other set of timesteps.

The action can be: a effective setpoint values for a set of setpoints of one or more industrial subsystems (e.g., components or collections thereof), which can be treated as an operation target or goal for the control loop to achieve; a single setpoint value for a single setpoint; a component setting (e.g., on/off); a set of granular control instructions for a set of industrial system components; and/or be any other action.

The effective setpoint value can be a target metric or sensor value indicative of the performance of a given industrial system or subsystem. The subsystem can include one or more industrial system components. In examples, a subsystem can include: components within fluidly connected circuit, components within thermally connected circuit, and/or other groups of components that have interdependent operation. The effective setpoints are preferably for the final outputs of the industrial (sub) system, but can alternatively be for an intermediate output, an input, and/or for any other suitable stage of the industrial (sub) system. The effective setpoint can be a global setpoint (e.g., for an industrial subsystem), a local setpoint (e.g., for a subset of industrial system components, for an industrial system component, etc.), and/or any other setpoint. The effective setpoint values are preferably target outcomes or reference points for a process variable (e.g., not component control instructions; do not specify how the target outcome is achieved; etc.), but can alternatively be lower-level control instructions (e.g., detailed instructions for specific equipment operation) and/or otherwise defined. The effective setpoints can be for process control, machine control, environmental control, and/or other control. Examples of setpoints can include: temperature (e.g., in, out), pressure (e.g., in, out), number of components that are on or off, individual component state (e.g., on/off, start/stop), flow rate, level (e.g., fluid level, mass, volume, etc.), load (e.g., computing load, etc.), concentration or density (e.g., chemical concentration, biological concentration, etc.), humidity, environmental quality (e.g., air quality), speed, position, torque, force, and/or other setpoints. Specific examples of setpoints include: an evaporator's leaving water temperature, the number of components in operation, the component start/stop command, and/or any other suitable setpoint. The control loop is preferably preconfigured to achieve the effective setpoint (e.g., by adjusting industrial system component operation on a granular level); alternatively, the control loop can be reconfigured or augmented such that it can control the industrial system components to achieve the effective setpoint.

The AI agent preferably concurrently determines the effective setpoint values for a set of setpoints (e.g., in the same prediction), but can alternatively determine each effective setpoint values independently. The setpoint values are preferably for an upcoming timestep (e.g., 1 or more timesteps or control cycles into the future), but can additionally or alternatively be for the current timestep or any other timestep.

The system can include one or more AI agents. Different AI agents can be for different: industrial system instances, industrial system types, industrial system campuses (e.g., including one or more buildings), industrial system buildings (e.g., including one or more subsystems), industrial system subsystems (e.g., including one or more components), industrial system components, setpoints, performance metric, and/or otherwise differ. In an example, the system can include a different AI agent for each industrial system building, and include an orchestration agent that coordinates between the different AI agents. In a second example, the system can include a different AI agent for each subsystem or component, and include one or more AI agents to coordinate between the subsystem or component AI agents (e.g., a hierarchy of AI agents). However, the system can include any other number of AI agents.

An AI agent can determine a set of effective setpoints based on: the industrial system state (e.g., current state, historical state, etc.), a set of constraints, a set of fallback values, auxiliary information (e.g., weather, ambient environment measurements, sociopolitical environment, etc.), and/or other information; examples shown in FIG. 1, FIG. 2, FIG. 3, FIG. 4, and FIG. 5.

The industrial system state is preferably received from the industrial system (e.g., in real- or near-real time, asynchronously, on a delay, etc.), but can alternatively be received from the user, a third party database, and/or any other suitable source. The industrial system state preferably includes a set of industrial system sensor values (e.g., values for key variables that define the industrial system's behavior and/or performance), but can additionally or alternatively include a classification (e.g., "stable", "unstable"), a value for the performance metric, and/or other information.

The set of constraints function as the first safety layer for an AI-enabled industrial system. In variants, the set of constraints can include a set of rules the AI agent is programmed to follow when making recommendations to ensure the safe operation of the industrial system. The constraints can be: automatically determined (e.g., based on documentation for the industrial system, based on constraints for other similar industrial systems, etc.), manually determined, and/or otherwise determined. The constraints can be static (e.g., the same for all operating contexts or industrial system states), dynamic (e.g., change based on the industrial system state), and/or otherwise vary or not vary. Different constraints can be defined for different: setpoints, subsystems, the entire industrial system, operation contexts (e.g., industrial system states), and/or for any other suitable component or combination thereof; examples shown in FIG. 6A, FIG. 6B, FIG. 7, and FIG. 8B. Examples of constraints can include: minimums and/or maximums (e.g., the range limit for a given setpoint), rate of change (e.g., rate of change that the AI agent is limited to for a given setpoint), step size (e.g., maximum amount of setpoint change that the AI agent is allowed to make, per step or cycle, from the prior setpoint value), minimum and/or maximum increment and/or decrement (e.g., number of incremental steps that are permitted), directional change frequency (e.g., the permitted change valence lability; the maximum frequency at which the agent-recommended setpoint can increase then decrease or vice versa; etc.), the minimum on time, the minimum off time, predictive constraints (e.g., industrial system state value to stay above or below), and/or other constraints.

The constraints can be hard constraints (e.g., absolute requirements; cannot be violated), soft constraints (e.g., desirable conditions; can be violated, optionally with a penalty, etc.), and/or any other type of constraint. Different constraint types can be solved or enforced differently; for example, soft constraints can be enforced using probabilistic methods, while hard constraints can be implemented as limits or thresholds.

The constraints can be used to limit the search space that the AI agent explores to determine the recommended action (e.g., setpoint value, values for a set of setpoints, etc.), to limit the predicted action values (e.g., setpoint values), and/or be otherwise used. The constraint can be on an industrial system state variable, on an outcome dependent on the setpoint (e.g., a dependent variable), on the performance metric (e.g., power consumption should not increase), on the setpoint itself, and/or be on any other suitable variable. In a first example, the constraint is on a per-setpoint basis. In an illustrative example, a condenser water temperature setpoint can have an allowed temperature with a minimum of 78° F. and a maximum of 84° F., a rate of change of 5° F./60 mins, a step size of 0.5° F., a minimum-to-maximum increment of 1-4 steps, and a maximum-to-minimum increment of 1-5 steps. In a second example, the constraint is on an industrial system state variable. In an illustrative example, a processing unit temperature cannot exceed 185° F. In a third example, the constraint is on the performance metric. In an illustrative example, the overall power consumed within a predetermined time window cannot increase over time or exceed a predetermined threshold.

A constraint can include: a limit (e.g., min/max threshold), a cost function, a pair thereof, and/or be otherwise constructed. The constraint can also be associated with a window of constraint satisfaction, wherein the actions must satisfy the constraint within the window. In examples, the constraint can represent an immediate threshold on how extreme a value can become (e.g., the cost function represents a sensor value as a variable; the limit encodes the maximum value for the variable; etc.); a record of how many undesirable but acceptable events occur (e.g., cost is 1 if even occurs and o if not; limit encodes the maximum number of events that are allowed in the window; etc.); a measure of how close a system is to a constraint violation (e.g., the cost function is learned on-policy from rollouts to the expected time of constraint violation, such as by using an HMM, etc.; the limit is a threshold selected based on the time a monitor needs to intercept a bad trajectory; etc.); be a constraint on the conditional value at risk (e.g., expected sum of costs over the $\alpha$-fraction of worst-case outcomes); be a chance constraint; include separate constraints for each industrial system state; and/or represent any other suitable constraint.

In a first variant, the constraints are used to prune the feasible set of actions (e.g., set of candidate setpoint values) that the AI agent can select from. In a first example, an action that would result in a worse performance metric is removed from the feasible action set. In a second example, an action that would cause an industrial system state variable to exceed a threshold is removed from the feasible action set. In a third example, an action that exceeds a threshold (e.g., maximum, minimum, etc.) is removed from the feasible action set.

Figure 8A:
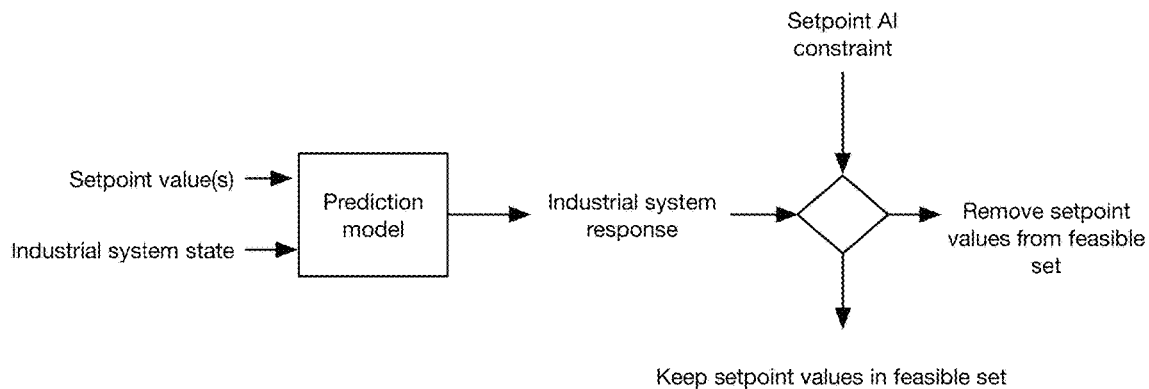
FIG. 8A is a schematic representation of a first variant of constraining the AI agent.
Figure 8B:
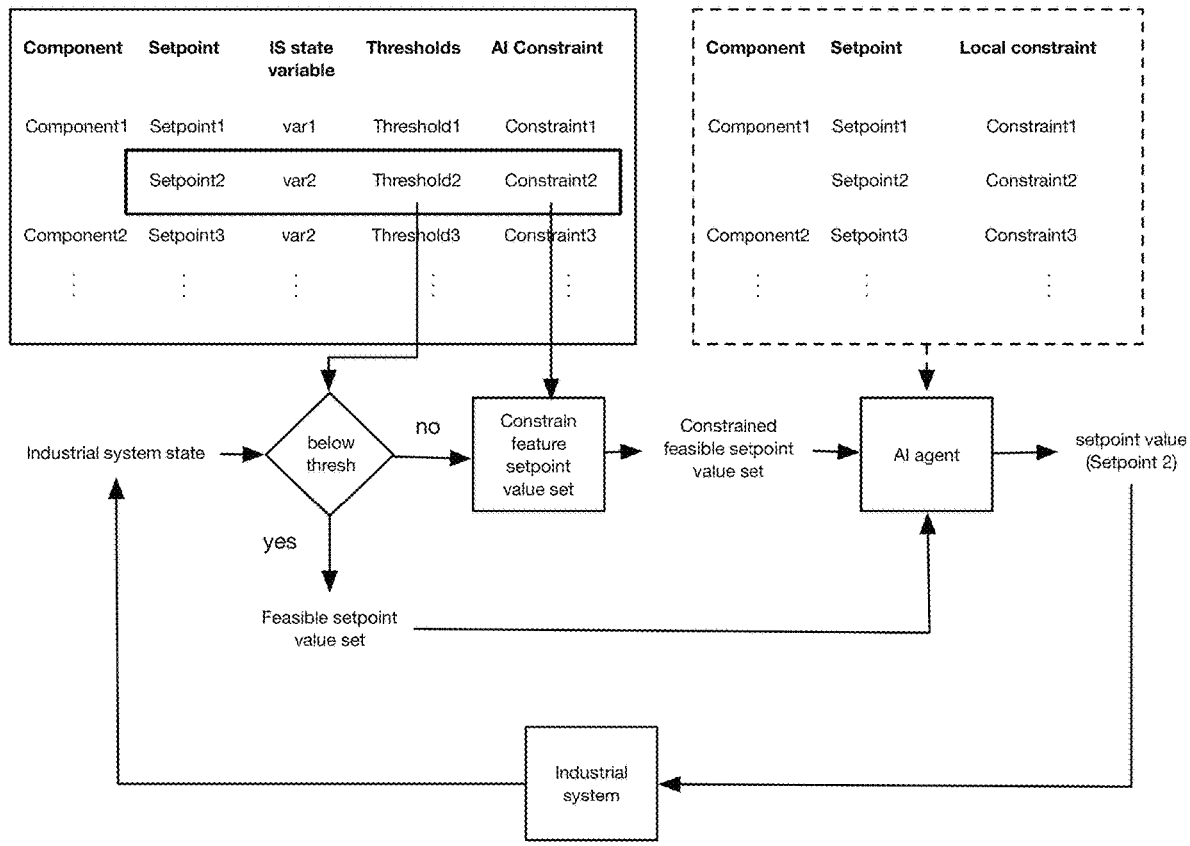
FIG. 8B is a schematic representation of a second variant of constraining the AI agent.

In a first embodiment, the constraints are predictive constraints (e.g., example shown in FIG. 8A). In this embodiment, one or more prediction models can be used to predict whether taking a candidate action (e.g., using the candidate setpoint value) would violate a constraint, wherein actions that violate one or more constraints are removed from the feasible set (e.g., candidate set). The prediction models can be physics models, mathematical models, neural networks (e.g., probabilistic models) learned on training state-action and target outcome pairs, and/or have any other architecture.

In a second embodiment, the constraints are implemented by adding restorative inductive priors at the AI agent policy level (e.g., the selection policy level). In this embodiment, the feasible set of actions that the AI agent can select from remains unpruned (e.g., AI agent is unconstrained) as long as the current state of the industrial system satisfies a set of pruning conditions, and the feasible set is pruned (e.g., AI agent is constrained) when the current state of the industrial system violates the set of pruning conditions (e.g., example shown in FIG. 8B). The set of pruning conditions can include: the industrial system state remaining below a set of threshold values (e.g., for each state variable); the industrial system state not violating a set of constraints (e.g., soft constraints); and/or other conditions. The threshold value can be a soft constraint value, be manually determined, set based on the respective constraint values (e.g., set underneath the hard constraint value, be a predetermined percentage of the constraint value, be a predetermined distance below the constraint value, etc.), or be otherwise determined. The feasible set of actions can be pruned using: a predetermined, manually specified, or learned set of rules, equations, or heuristics; a predictive model (e.g., similar to the predictive model used in the first embodiment); a model determined based on the constraint or direction of the constraint boundary; based on the threshold (e.g., using the threshold as a filter); and/or using any other suitable pruning method. In a specific example, the AI agent is allowed to select any action from the feasible set as long as the industrial system state underneath a threshold value, wherein the feasible set of actions is filtered based on the setpoint constraint when the industrial system state crosses the threshold value. This embodiment enables the system to observe the current industrial system state from the streaming data, and, based on whether a constraint has been violated or not, allows the agent to maintain the current industrial system state, but prevents the agent from moving in the control direction of further violation on that constraint and/or moving toward the constraint boundary.

However, the feasible action set (candidate setpoint value set) can be otherwise constrained, pruned, filtered, or otherwise modified.

In a second variant, the constraints are used to evaluate the selected set of actions (e.g., the selected set of setpoint values). In an example, AI agent-predicted action sets (setpoint value sets) that cause the industrial system to violate a constraint, that have setpoint values that violate a constraint, and/or that cause an undesirable performance metric are filtered out after prediction.

However, the constraints can be otherwise defined and/or used.

An AI agent can include one or more machine learning models. The AI agent preferably includes one or more reinforcement learning models, but can additionally or alternatively include optimization methods, neural networks (e.g., CNN, DNN, CAN, LSTM, RNN, encoders, decoders, deep learning models, transformers, foundational models, etc.), clustering approaches, and/or other methods. However, the AI agent can include: a digital twin, a simulation, a hidden Markov model, a physics model, a set of rules, model predictive control (MPC) model, PID control model, fuzzy logic control model, and/or any other model architecture.

The AI agent is preferably trained or learned using reinforcement learning, but can additionally or alternatively be trained or learned using supervised learning, unsupervised learning, self-supervised learning, semi-supervised learning (e.g., positive-unlabeled learning), and/or other methods. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data. Examples of training data can include training industrial system stat and target action pairs, training industrial system state-action and target response tuples, training industrial system state-action and performance metric tuples, and/or other data. In a first example, the AI agent is trained to predict the action given the industrial system state. In a second example, the AI agent is trained to predict the industrial system response (e.g., next state) given an industrial system state and subsequent action. In a third example, the AI agent is trained to predict the performance metric (and/or how the prediction metric changes) for the next timestep given an industrial system state and subsequent action. The training data can be: historical data (e.g., from historical industrial system operation); data generated by exploring the action space; determined from a simulation (e.g., using the learned environment model), and/or otherwise determined.

Figure 5:
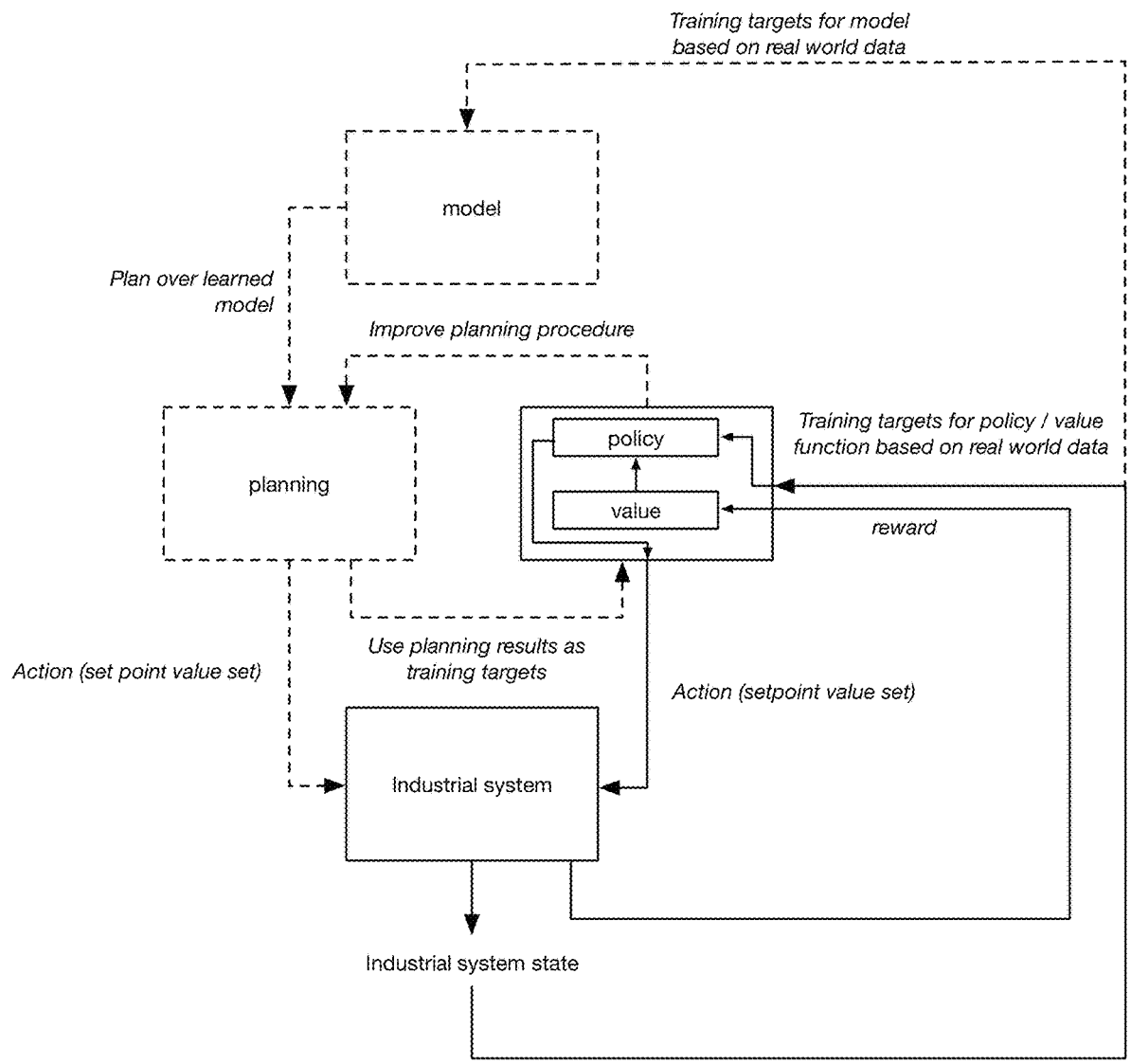
FIG. 5 is a schematic representation of a variant of the AI agent.
Figure 7:
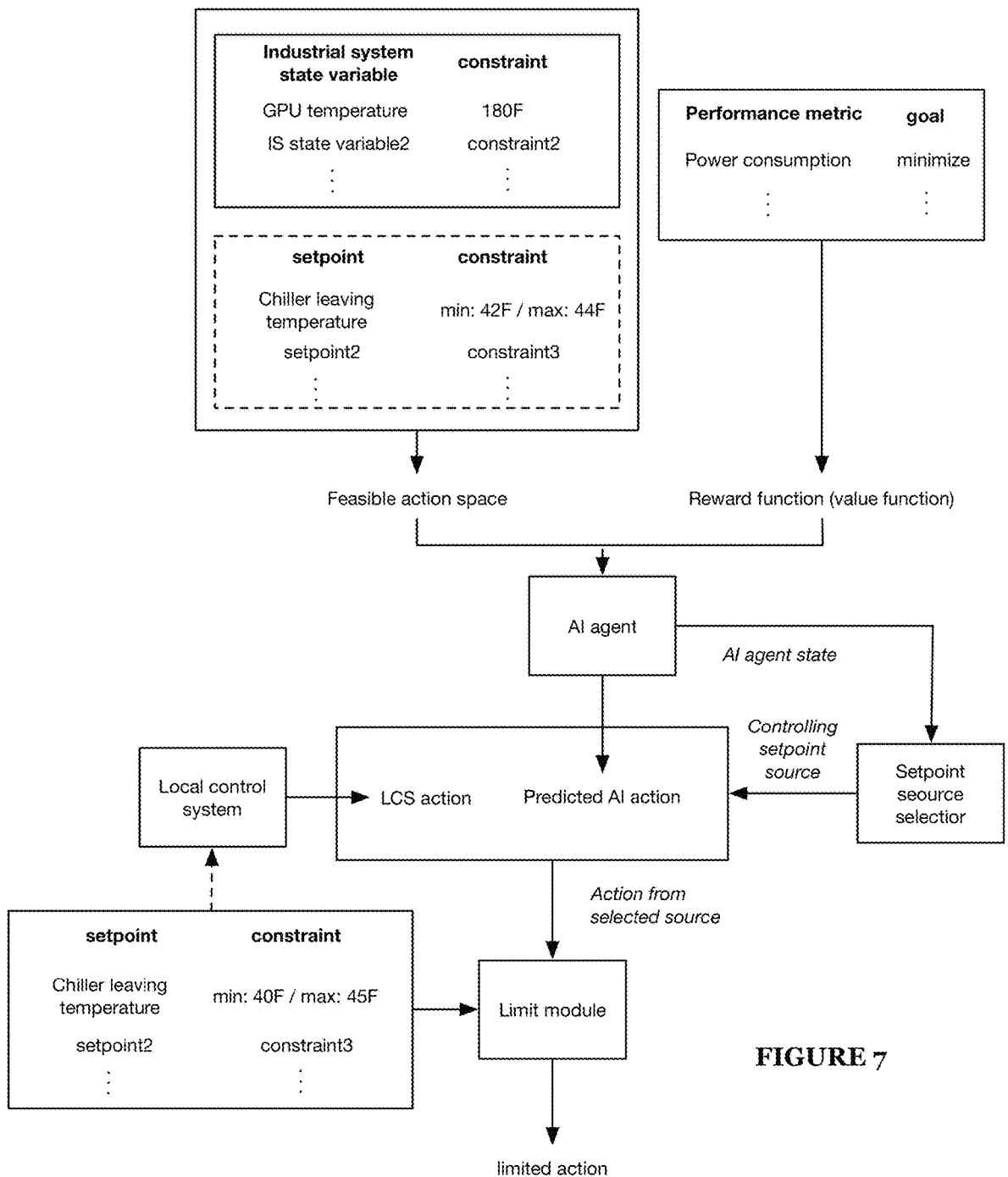
FIG. 7 is an illustrative example of a variant of the method.

In variants, the AI agent includes a reinforcement learning (RL) agent that learns a policy to predict a setpoint value from a feasible action set (candidate setpoint value set), using a value or cost function (e.g., to reward or penalize the policy for good or bad predictions); example shown in FIG. 5. In an illustrative example, the AI agent can be similar to that described in U.S. application Ser. No. 18/697,101 filed 29 Mar. 2024 incorporated herein in its entirety by this reference, or be any other suitable AI agent.

The RL agent can be operable between: an explore stage, wherein the RL agent is determining new actions to try in order to explore the action space (e.g., expand the training data set and coverage); and an exploit stage, wherein the RL agent predicts actions using the learned policy; and/or any other suitable stage.

In examples, the policy can include: a softmax policy (e.g., probabilistic action selection) where the policy selects actions based on a softmax function of the reward values for an action-state pair (setpoint value-state pair); an epsilon-greedy policy (e.g., simple exploration-exploitation) where the RL agent chooses an action with a probability of epsilon to explore a new action randomly; a Boltzmann exploration (e.g., temperature-based exploration) where the RL agent chooses an action based on a probability of epsilon that decays as the agent's temperature or exploration rate decreases (e.g., gradually lowered throughout operation); a rule-based policy (e.g., predefined action selection) that relies on a set of predefined rules to dictate agent actions in different contexts; a model-based policy (e.g., internal world representation) that learns a model of the environment (e.g., of the industrial system) through interaction or historical data, which can enable the agent to explore different strategies in a simulated space; a deep-Q-network policy (e.g., learning from experience) where the agent uses a deep neural network to learn the value of taking specific actions in different states (e.g., by interacting with the environment and using the DQN to update its understanding of the best actions to take in various situations based on the resultant reward); a combination of the above; and/or any other policy.

In examples, the reward function (or cost function) can include: a negative reward, a state-based cost (e.g., reward or cost value assigned to each possible agent state), action-based cost (e.g., reward or cost value assigned to each possible action), combined cost function (e.g., combining state and action based cots), shaped reward (e.g., modifying the reward signal to encourage desired behavior; providing rewards for taking steps in the right direction), dense reward (e.g., receiving rewards after every action), sparse reward (e.g., rewarding at specific milestones), scaled reward (e.g., scaling rewards based on importance or difficulty to achieve), and/or other cost and/or reward functions.

In examples, the reward function can be determined: based on the performance metric (e.g., $S(a,s)=-\text{predicted\_power}(a, s)$; $S(a,s)=\text{predicted\_output}(a, s)$; based on distance to a threshold metric value; etc.), based on the constraint (e.g., sensor values from the industrial system state are represented as a variable in the cost function; a binary cost function based on whether an undesirable event has occurred, etc.), and/or otherwise determined. The policy architecture and/or reward/cost function can be manually determined, selected from a set of candidate architectures and functions after testing, learned, and/or otherwise determined. The weights, connections, features (e.g., variables), and/or other hyperparameters of the policy and/or reward/cost function are preferably learned (e.g., through exploration-exploitation and updating the agent based on the state-action-effect tuple), but can additionally or alternatively be manually specified or otherwise determined.

In variants, the RL agent can be a model-based RL agent that learns a dynamic model of the industrial system (e.g., without directly exploring using the real environment, such as the real industrial system), then learns a policy and/or reward function by planning over the dynamic model, wherein the learned policy is used to predict setpoint values, example shown in FIG. 5. In variants, this can help overcome the sparse data issue, since model-based RL agents can be more sample efficient than model-free agents (e.g., only need hundreds of data points instead of the 10 million or more data points needed by model-free agents). The model can be a physics model (e.g., digital twin of the industrial system), a rule-based model, a Gaussian Process, Gaussian Mixture Model (GMM), deep network, or other model. The models can be learned based on sample trajectories using supervised learning, manually specified, or otherwise learned. In an illustrative example, a model-based RL agent can: a) plan over a learned model, b) use information from a policy/value network to improve the planning procedure, c) use the result from planning as training targets for a policy/value, d) act in the real world based on the planning outcome (e.g., exploit the planner), e) act in the real world based on a policy/value function (e.g., exploit the policy), f) generate training targets for the policy/value based on real world data, and g) generate training targets for the model based on real world data. The planner can help the AI agent learn the policy/value functions (e.g., constructing a training target from the search and to define a loss for policy/value training, using the planner output as a Q-learning target, training on MSE loss, training on cross-entropy loss between the softmax of the Q values from the search and the Q values of a learned neural network, etc.), be used during exploitation (e.g., actions are selected directly from the planning output instead of using the policy; using the planner to implement MPC; etc.), be used during exploration (e.g., enable multistep exploration to explore new reward regions, which one-step exploration methods would fail to identify due to jittering behavior), and/or be otherwise used. The planning procedure can be improved using value priors (e.g., bootstrapping the current prediction of state or state-action to prevent planning search, reducing the depth of the search, etc.), by using policy priors (e.g., the policy network influences the distribution of states used as starting points for planning, etc.), and/or otherwise improved.

The RL agent can be a constrained RL agent. The constrained RL agent can use the Markov decision process (MDP) framework, the constrained MDP (CMDP) framework (e.g., wherein the feasible action set is defined using a cost-based constraint function, defined in the same way as an expected return or average return metric, and a cost threshold), and/or any other suitable framework. The constrained RL agent is preferably constrained using the constraints as discussed above (e.g., by constraining the feasible action set, by filtering predicted action sets, etc.), but can be constrained by incorporating the constraint into the policy, and/or otherwise constrained.

However, the RL agent can be any other suitable type of RL agent.

However, the AI agent can be any other suitable type of AI agent (e.g., use any other suitable type of network architecture and/or combination thereof).

The AI agent can be associated with one or more AI agent states, which function to characterize AI agent operation. The AI agent state can be used by the industrial system (e.g., the local control system, the setpoint source selector, etc.) to determine whether the AI actions (e.g., AI agent-determined setpoint values) can or should be used for industrial system control, or be otherwise used. The AI agent preferably has a single state at any given time, but can alternatively have multiple states. The AI agent state is preferably determined by the AI agent itself, but can additionally or alternatively be determined by a state module (e.g., executing alongside the AI agent in the remote computing system), by a local module on the industrial system (e.g., when the AI setpoints are not received, when the AI setpoints are received too late, etc.), by the setpoint source selector, and/or by any other component. The AI agent state is preferably separate from the setpoint values, but can additionally or alternatively be the setpoint values. The AI agent state is preferably sent to the industrial system or modules thereof (e.g., the local control system, the setpoint source selector, the limit module, etc.), but can alternatively be determined by modules of the industrial system (e.g., based on the AI-determined setpoint values; based on AI agent analyses of its operation, connectivity, or attack risk; etc.).

The AI agent state is preferably a state classification (e.g., a single value, a label, etc.), but can additionally or alternatively include a state vector (e.g., wherein values in each vector index describe a different attribute of the AI agent), the setpoint values, a prediction metric (e.g., prediction accuracy, prediction precision, prediction F-score, etc.; determined based on the actual vs. predicted industrial system state variable value; etc.), and/or be otherwise constructed. Examples of AI agent states can include: "connection loss" (e.g., when the connection between the industrial system and the AI agent is down, detected from the AI agent side); "learn" (e.g., when the AI agent is in exploration mode); "optimize" (e.g., when the AI agent is actively optimizing); "AI constrained" (e.g., when the feasible set of actions is empty, when the constraints have pruned out all feasible actions, when the feasible set of actions has less than a threshold number or distribution of actions, when no viable action can be found, when an AI-selected action violates or would cause an industrial system variable to violate a soft constraint, when an when an AI-selected action violates or would cause an industrial system variable to violate a hard constraint, etc.); "internal error" (e.g., when the platform hosting the AI agent has an error); "operator override" (e.g., an operator has requested manual control); "industrial system bad data" (e.g., the industrial system cannot be used for action prediction); "stable"/"unstable' (e.g., whether the AI agent is performing consistently over time, based on a timeseries of other AI agent states, etc.); "ready" (e.g., whether the AI agent is ready to control the industrial system); and/or any other suitable state.

However, the AI agent state can be otherwise determined, defined, and/or used.

The AI agent preferably runs on a computing system that is remote from the industrial system (e.g., remote computing system, a platform, a cloud computing system, etc.), but can alternatively run on-premises (e.g., locally on the industrial system, etc.), run on a distributed system, and/or run on any other suitable system with any other configuration relative to the industrial system. The platform hosting the AI agent can optionally include other components, such as an industrial system state analysis module (e.g., configured to analyze and/or classify the industrial system state); a connection health monitoring modules; and/or any other suitable module.

When the platform is remote from the industrial system, the platform can be connected to the industrial system (e.g., the control loop, the local control system, etc.) via one or more communication connections (e.g., over a wired or wireless connection, such as the Internet, ISP links, WAN connections, etc.). In variants, the health of this connection can be monitored to protect against man-in-the-middle attacks or other attacks. In variants, the industrial system can also include connection health monitoring modules of the same or different type.

In a first example, the connection can be monitored using a heartbeat system, which can determine connection health based on a heartbeat (e.g., periodic message, expected message) received by the platform from the industrial system, a heartbeat received by the industrial system from the platform, and/or messages reflected back to the sending system by the receiving system. In examples, this can be used to determine whether a connection is established or broken, determine the round-trip latency of platform communications, determine the latency between the industrial system and the platform, and/or determine other network metrics. The heartbeats (e.g., messages) can include: signatures (e.g., from a synchronously rotating key, the heartbeat signed by the receiving system's private key, etc.), a timestamp (e.g., transmission timestamp, etc.), a state value, a nonce or integer, or any other suitable message. In a first embodiment, the heartbeat from the industrial system can include a timestamp, wherein the industrial system can determine that the connection is healthy when the platform echoes the timestamp back to the industrial system. In a second embodiment, the heartbeat from the platform can include an integer generated by the platform (e.g., an incremented integer), wherein the platform can determine that the connection is healthy when the industrial system echoes the integer back to the platform. In a third embodiment, the connection health can be verified using both the first and second embodiments, or otherwise performed.

In a second example, the connection and/or the overall industrial system security can be monitored using an anomaly detection model run on the industrial system data. In this example, the anomaly detection model(s) can detect anomalies in the industrial system data streams and/or industrial system operation, which can be indicative of bad actors posing as an operator, indicative of an ongoing attack, and/or indicative of other adverse events. In a first embodiment, the system can determine a set of baselines for the industrial system (e.g., a baseline, average, or typical pattern or value for each industrial system data stream, based on historical data, etc.), wherein the anomaly detection model can detect anomalies by detecting deviations away from the baseline. The anomaly detection model(s) can optionally classify the type of adverse event based on the type of deviation. In a second embodiment, the anomaly detection model(s) can detect an anomaly by detecting abnormal patterns in one or more of the industrial system data streams (e.g., temperature data, cooling data, etc.). However, the anomaly can be otherwise determined. In response to detecting the anomaly, the system can remediate the anomaly by: failing over to another setpoint source, alerting a user, automatically remediating the anomaly (e.g., blocking the IP address) and/or otherwise remediating the anomaly and/or mitigating the anomaly's effect on industrial system operation.

The connection health can be used to determine the AI agent state (e.g., whether the AI setpoint values or actions can be used for physical component control), used to determine whether the industrial system state can be used for action prediction (e.g., by the AI agent), and/or otherwise used. In an example, the AI agent state is disconnected or unstable when the latency (e.g., round-trip latency) exceeds a threshold, when the industrial system data is received too late (e.g., one-way latency is too high), when an anomaly is detected, and/or when other conditions are met.

However, the connection health can be otherwise monitored and/or determined.

In variants, the platform can optionally include an industrial system state analysis module (IS state analysis module), which functions to monitor the health of the industrial system state values. The IS state analysis module can include: a set of rules, heuristics, thresholds, conditional statements, and/or be otherwise configured. The IS state analysis module can be used to: determine whether the industrial system state values can be used for action predictions (e.g., whether the RL agent inputs qualify as good data); whether a constraint has been violated; and/or otherwise used. For example, the IS state analysis module can classify the industrial system state as "bad data" when one or more data values exceed a constraint threshold, satisfies a predetermined set of conditions, deviates from a predicted value by more than a threshold difference, and/or otherwise classify the industrial system state as "bad data", wherein bad industrial system states: are not used for action prediction, cause the AI agent state to fall into a predetermined class (e.g., "unstable", "constrained", etc.), cause a notification to be sent to an industrial system operator, and/or otherwise managed.

However, the platform can include any other suitable module.

The setpoint source selector of the system functions as the second layer (e.g., second safety layer), and functions to select a setpoint source (controlling setpoint source) to provide the setpoint values for industrial system control. The setpoint source selector preferably does not select the setpoint values themselves, but can additionally or alternatively select the setpoint values, the setpoint value set, and/or select any other suitable data object. The setpoint source selector preferably selects a single setpoint source to control the entire industrial system for a given timestep or control cycle, but can alternatively select multiple setpoint sources for a given timestep (e.g., select different setpoint sources for different buildings, component groups, etc.). The setpoint source selector preferably runs locally on the industrial system (e.g., be part of the local control system, be separate from the local control system, run on the same machine as the local control system, run on a redundant local machine from the local control system, etc.), but can additionally or alternatively run on the remote computing system, and/or any other suitable location. When the setpoint source selector runs locally on the industrial system, the setpoint source selector can receive remote control system information (e.g., AI agent information, such as the AI agent status and/or setpoint values) from the remote computing system(s). When the setpoint source selector runs remotely on the remote computing system, the setpoint source selector preferably receives local control information (e.g., industrial system state, local setpoint values determined by the local control system, etc.) from the industrial system. However, the information required to select the setpoint source can be otherwise determined.

The system can include one or more setpoint source selectors. The setpoint source selector can select the setpoint source from a set of candidate setpoint sources. The candidate setpoint sources can include: the AI agent, the local control system of the industrial system, a manual operator, alternative machine-learning based control algorithms, a set of default values, and/or other setpoint sources. The setpoint source can be selected based on: the AI agent state, the AI agent connection state to the industrial system, the local control system state, the industrial system state, a manual selection, the setpoint values determined by the setpoint sources, and/or any other suitable data. In a specific example, the setpoint source selector selects the setpoint source without considering the respective setpoint values. In a second example, the setpoint source selector selects the setpoint source based at least partially on the respective setpoint values. The setpoint source selector can include: a set of rules, a set of heuristics, voting mechanism (e.g., weighted voting mechanism), decision tree, machine learning model, and/or have any other selection method. The setpoint source selector can use a different selection method or architecture for each: industrial system operating context, AI agent state (e.g., different selection methods for "exploitation" state vs "learning" state), and/or other condition.

Figure 9:
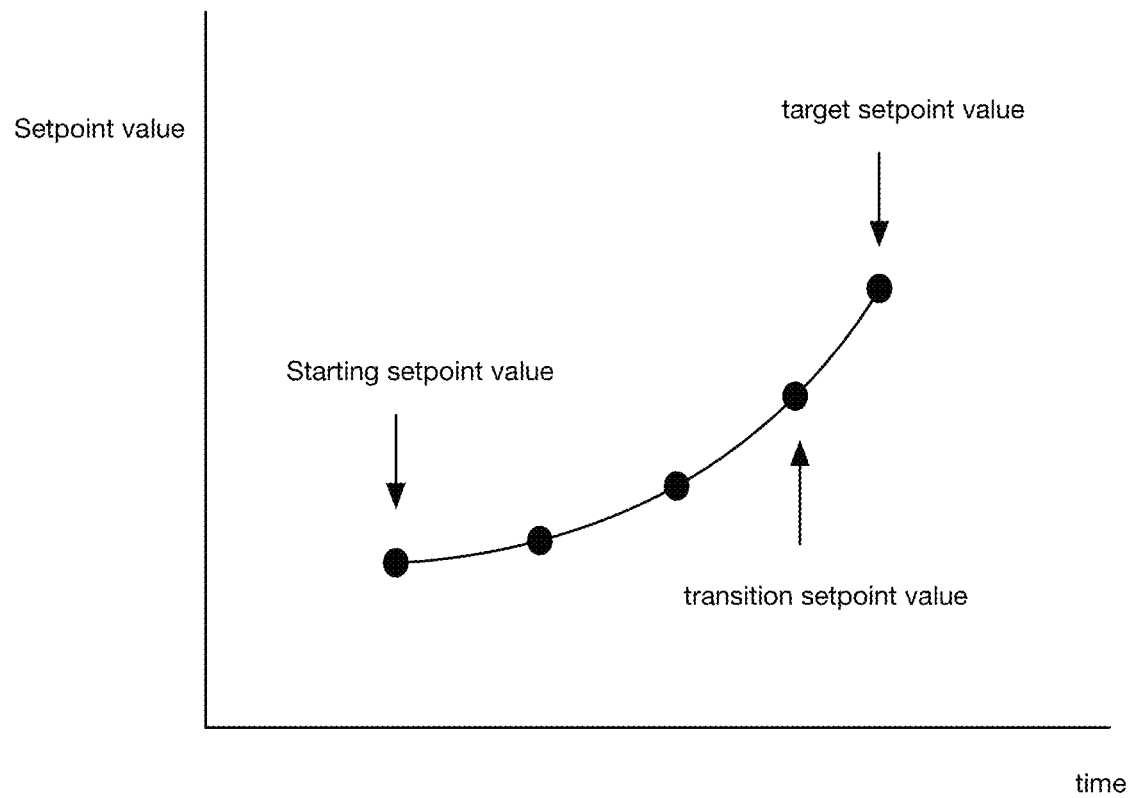
FIG. 9 is an illustrative example of determining a set of transition setpoint values.

The system can optionally include one or more transition modules, which function to determine a set of transition setpoint values to smooth the transition between a starting setpoint value and a target setpoint value (e.g., example shown in FIG. 9). This can help avoid bang-bang control, avoid rapid changes in the control instructions, and/or confer other benefits. The transition module can determine the transition setpoint values when a new setpoint value is determined, when a new setpoint source is selected, for every timestep (e.g., iteratively recalculate the transition setpoint values based on a current setpoint value and the target setpoint value), and/or at any other suitable frequency. The starting setpoint value can be for a current timestep, a current control cycle, a future timestep or control cycle (e.g., wherein setpoint values up to the future timestep or control cycle have already been determined), and/or any other suitable time. The target setpoint value is preferably the value for a setpoint provided by the setpoint source, but can be another value. The transition setpoint values can span: a control cycle (e.g., wherein the transition setpoint values gradually transition the setpoint value from the starting value to the target value over the course of a single control cycle); a predetermined time window (e.g., specified for the setpoint); and/or any other duration of time. The transition module can determine the transition setpoint values setpoint by setpoint, for an entire set of setpoint values (e.g., together), and/or for any other suitable set of setpoints. The transition module can determine the set of transition values using: interpolation, a prediction model, a lookup table, and/or any other suitable method.

In variants, the transition module can optionally determine a setpoint transition priority (e.g., order), wherein the setpoints are sequentially transitioned based on the priority. The transition module can determine the setpoint transition priority based on a predetermined set of priorities, based on a ruleset (e.g., transition the setpoints with large value changes first, then transition the setpoints with smaller value changes), and/or otherwise determine the transition priority.

However, the transition module can be otherwise configured.

The system can optionally include one or more limit modules, which function as the third layer (e.g., third safety layer) and ensure that the setpoint values do not exceed a set of local constraints. The limit module preferably sits between the setpoint source(s) and the control loop, and functions as a final check on the setpoint values before use. The limit module can evaluate: the controlling setpoint values from the setpoint source selected by the setpoint source selector; the transition setpoint values; and/or any other suitable set of values. The limit module can evaluate: each setpoint value; only the target setpoint values; every N values; and/or any other suitable set of setpoint values.

The limit module can evaluate the setpoint values using a set of local constraints. The local constraints used by the limit module are preferably different from the AI constraints used by the AI agent (e.g., example shown in FIG. 7), but can alternatively be the same or subset of the AI constraints. In a first example, the local constraints can be on the setpoint values (e.g., the chilled water differential pressure setpoint must be between 6° F. or 18° F.), while the AI constraints can be on the industrial system state variable values (e.g., the hard drive temperatures must be below 180° F.). In a second example, the local constraints can be the hard AI constraints. However, the local constraints and the AI constraints can be otherwise related or unrelated. The local constraints can be dynamic (e.g., change based on industrial system state, over time, etc.), or be static.

The limit module can: fail the entire setpoint value set when a setpoint value fails a constraint; selectively fail individual setpoint values from the setpoint set (e.g., use default values for those setpoints instead); clip the setpoint values (e.g., to the minimum or maximum permitted setpoint value for the setpoint); and/or otherwise manage the setpoint values. When the limit module fails the setpoint value or set thereof, the value for the setpoint can be set to: a default value, the last setpoint value that was used, and/or any other suitable setpoint value.

The system can include one or more limit modules for: an industrial system, building, component group, component, setpoint, and/or any other suitable element. The limit module preferably runs on the industrial system (e.g., as part of the local control system, separate or downstream from the local control system, etc.), but can additionally or alternatively run on the remote computing system (e.g., wherein the industrial system sends setpoint values to the limit module for evaluation) or on any other suitable system. However, the limit module can be otherwise configured.

The system can be used with one or more industrial systems, which function to provide a product and/or service in an industrial setting. Examples of industrial systems that the method can be used with can include: cooling centers, data centers, manufacturing plants or reactors (e.g., chemical plants, pharmaceutical plants, etc.), power plants (nuclear, coal, fossil fuel, etc.), commercial buildings, hydroelectric dams, refineries, power generators, railway, pipelines, trading platform infrastructure, payment platform infrastructure, core telecommunication networks, and/or other systems or facilities. The industrial systems can be mission-critical (e.g., infrastructure) or not mission critical. In variants, the industrial systems can be safety critical and have high uptime requirements, have a potential for high consequences for failure (e.g., loss of data, life, environmental damage, significant economic losses), and/or be otherwise characterized.

Each industrial system can include one or more: physical components, local control systems, control loops, and/or other elements. In an example, an industrial system can include: a set of physical components; a (legacy) local control system (e.g., BMS, SCADA, etc.) that determines values for a set of component group setpoints; and one or more control loops that generate low-level control instructions to control the set of physical components to collectively achieve the setpoint values.

The physical components of the industrial system function to collectively create the product and/or service provided by the industrial system. The physical components can also: generate the industrial system state (e.g., wherein the state is an aggregation of the component states or measurements); be control targets for the control loop and/or setpoint sources; and/or perform any other functionality.

The physical components can be managed as a group (e.g., as a building, as a component group, etc.), or managed individually. The component group (component subsystem, industrial subsystem, etc.) preferably includes components that are connected together (e.g., physically connected, fluidly connected, thermally connected, electrically connected, communicatively connected, etc.), but can alternatively include components that are not connected together. The industrial subsystem can be conceptual groupings (e.g., manually determined, learned, etc.), physical groupings (e.g., components that are collocated together), and/or otherwise defined. Each industrial subsystem can perform a subtask of the overall industrial system process, or be otherwise defined. Examples of component groups (subsystems) can include: a chilled water system (e.g., including one or more chillers, a heat sink, etc.), an evaporator system, a condenser system, and/or any other suitable subsystem.

The physical components in an industrial system can include: controllable components, data sources, and/or other components.

The controllable components function as industrial system inputs, and are controlled to collectively achieve an effective setpoint value. The controllable components can be directly controllable by the system (e.g., the system can control the actuator's setpoint or actuation), indirectly controllable by the system (e.g., the system can control the actuator's state by controlling another actuator), not controllable by the system, and/or otherwise controllable or not controllable. In variants, the controllable components can be controlled by the control loop, such as by: controlling power provision (e.g., voltage, current, etc.), controlling a setting (e.g., rpm, flow rate, etc.), calling a component function (e.g., calling rotate( )), and/or otherwise controlling the component. The controllable components can be associated with a controllable component state (e.g., arm pose, rotation rate, fluid flow rate, pump rate, etc.), which can be included in the industrial system state. The controllable components can include actuators (e.g., pumps, solenoids, valves, impellers, heaters, etc.), equipment (e.g., a media preparation tank, a bioreactor, a chiller, a mixer, etc.), and/or other industrial system components. Specific examples of controllable components can include: a chiller (steam, electric, air-cooled, modular air-cooled chillers, etc.), evaporator, cooling tower, hot thermal energy storage, cold energy storage, reactor, condenser, pump, fan coils, CRAC units, air handling units, HVAC units, ammonia compressors, bioreactors, and/or other component.

The data sources function to generate industrial system measurements, which can be included in the industrial system state. The data sources can include: the controllable components, sensors, and/or any other suitable data source.

Examples of sensors that can be used can include: temperature sensors, flow rate sensors, pressure sensors, voltage sensors, current sensors, mass sensors, concentration sensors, timers, resistance sensors, volume sensors, capacitance sensors, humidity sensors, actuator state sensors, and/or other sensors.

Each industrial system can generate a set of industrial system data (e.g., industrial system state). The set of industrial system data preferably includes a set of industrial system data streams, but can additionally or alternatively include singular values, constants, and/or other data. Examples of industrial system data can include: sensor data streams (e.g., all or a subset of the sensor data streams, such as temperatures, pressures, flow rates, power consumption, processing load, etc.); secondary data streams that were derived or aggregated from the sensor data streams, such as power, energy, percentage, efficiency, and/or other secondary data; actuator state data streams; and/or other data generated by the industrial system and/or components thereof. An industrial system state can include the industrial system data values (e.g., industrial system data parameter values, industrial system variable values, etc.) and/or derivative information for a given timestep or time window; alternatively, the industrial system state can be otherwise defined.

Each industrial system can be associated with a set of setpoints, wherein the setpoint sources generate values for the setpoints. Each setpoint is preferably for an industrial subsystem (e.g., for the input of the industrial subsystem, for the output of the industrial subsystem, etc.), but can additionally or alternatively be for an actuator, a piece of equipment, and/or for any other suitable industrial system component. Examples of setpoints include: temperature in, temperature out, pressure in, pressure out, mass in (e.g., of a solid, of a liquid, etc.), mass out (e.g., of a solid, of a liquid, etc.), environmental parameters (e.g., humidity, light, etc.), pose, rates thereof (e.g., flow rate, temperature increase/decrease, kinematics, etc.), number of components on or off (e.g., start/stop setpoints), torque, force, and/or any other suitable setpoint. Specific examples of setpoints can include: evaporator leaving water temperature, number of a given equipment type (e.g., on or off, available to control, etc.), chilled water differential pressure setpoint (e.g., lead, lag), chiller run/stop command, and/or any other suitable setpoint.

Each setpoint can be associated with a set of possible values (possible setpoint values). The possible setpoint values can be: binary values (e.g., on or off), continuous values (e.g., temperature, pressure, flow rate, etc.), discrete values (e.g., number of chillers, etc.), and/or otherwise defined.

Each industrial subsystem is preferably controlled to achieve a target setpoint value but can additionally or alternatively be controlled according to a set of control instructions (e.g., machine-level instructions for each of the constituent components), and/or otherwise controlled. The control instructions can be generated based on the target setpoint value, based on the industrial system state, and/or otherwise determined.

Each industrial system can include one or more local control systems, which function to determine a set of local setpoint values for a set of setpoints for an industrial system. Both the AI agent and the local control system preferably indirectly control the industrial system components (e.g., via the setpoint values), but one or both can alternatively directly control the industrial system components. The local control system(s) preferably determines setpoint values for each industrial subsystem of the industrial system, but can additionally or alternatively determine a setpoint for the overall industrial system, setpoints for individual components (e.g., actuators), and/or setpoints for any other suitable set of components.

The local control system(s) preferably determines values for the same set of setpoints as the AI agent, but can alternatively determine values for a different set of setpoints. The different set of setpoints can be a subset of the AI agent set, intersect with the AI agent set, be a superset of the AI agent set, be entirely different from the AI agent set, or be otherwise related to the AI agent set. The local control system preferably controls the same set of industrial system components, but can alternatively control different industrial system components.

The local control system(s) preferably run contemporaneously (e.g., in parallel, concurrently, etc.) with the AI agent, but can alternatively be run asynchronously with the AI agent (e.g., wherein the local control system(s) are used to determine the setpoints when the AI agent is not or cannot determine the setpoints), and/or with any other suitable temporal relationship with the AI agent. For example, the local control system preferably determines values for the setpoint set at the same frequency as the AI agent. The local control system is preferably always determining local setpoint values, such that the industrial system can fall back on the local setpoint values at any time, but can alternatively only determine local setpoint values when the local control system is selected, when the AI agent fails (or is predicted to fail), and/or when other conditions are met.

The local control system(s) are preferably legacy systems (e.g., in place before the AI agent or platform was implemented), but can additionally or alternatively be new systems and/or be deployed at any other suitable time. The local control system(s) preferably execute locally to the industrial system, but can additionally or alternatively be run remotely. The pre-existing local control system(s) are preferably not replaced by the AI agent (e.g., the pre-existing local control systems are augmented by or intermittently used in lieu of the AI agent), but can alternatively be replaced by the AI agent.

The local control system(s) preferably generates the local setpoint values based on the industrial system state (e.g., set of industrial data values), but can additionally or alternatively generate setpoints based on manual input, a set value, and/or any other suitable input. The industrial system state used by the local control system is preferably the same as that used by the AI agent, but can alternatively be different (e.g., include data from different sensors, equipment, etc.; include different transformations of the data; etc.).

The local control system(s) preferably generate the local setpoint values using a set of local constraints, but can alternatively generate the local setpoint values without using local constraints. The set of constraints is preferably the same as that used by the AI agent, but can alternatively be different (e.g., include constraints for different setpoints, different industrial system state variables, etc.).

The local control system(s) are preferably deterministic, but can additionally or alternatively be probabilistic and/or nondeterministic. The local control system(s) can leverage: rules, heuristics, conditionals (e.g., if-else statements, decision trees), optimizations, model predictive control, hidden Markov models, and/or other methodologies. Examples of local control systems that can be used include: building management systems (BMS), Programmable Logic Controller (PLC), Supervisory Control And Data Acquisition (SCADA), and/or any other suitable local control system.

Each industrial system preferably includes a single local control system, but can alternatively include multiple local control systems (e.g., one for each industrial subsystem).

The local control system and/or another industrial system module can optionally send information to the AI agent. Examples of information that can be sent include: the industrial system state (e.g., one or more state variable values, such as component states, sensor readouts, etc.), whether the AI agent is controlling the system (e.g., whether the AI agent was selected by the setpoint source selector as the controlling setpoint source), why the AI agent is not controlling (e.g., operator override, local constraint violation, etc.), the operator's desired AI agent state (e.g., off, optimize, learn, etc.), heartbeats, echoes, and/or other information.

The local control system and/or another industrial system module can optionally determine a control system state, which can optionally be reported to the AI agent, be reported to the setpoint source selector, and/or to any other suitable endpoint. The control system state is preferably a state classification, but can alternatively be a set of values or be otherwise constructed. Examples of the control system state can include: AI operational, waiting for stable AI system, constraint violations (e.g., temperature excursion, pressure excursion, etc.), operator override, waiting to restart, custom states, and/or any other suitable state.

However, the local control system can be otherwise configured.

Each industrial system can include one or more control loops, which function to generate low-level control instructions for component control (e.g., individual component control, component set control, etc.). The industrial system can include: a control loop for each industrial subsystem, a control loop for multiple industrial subsystems, a control loop for each piece of equipment, a control loop for each component, a single control loop, and/or any other suitable number of control loops. A control loop preferably generates the control instructions to achieve a setpoint value (e.g., a value from the selected setpoint source, such as the local setpoint or the agent setpoint; a transition setpoint value; etc.), but can be otherwise configured. The control loops preferably determine the control instructions based on the setpoint value, the component state, the component states of related components, and/or based on any other suitable information. The control loop can determine the control instructions using a set of rules, lookup tables, conditional statements, and/or other methods. Examples of control loops that can be used include PID control loops, on-off control (e.g., bang-bang control), bang-bang with hysteresis, cascade control, model predictive control (MPC), and/or any other suitable control loop.

The control loop preferably runs at a predetermined control frequency (e.g., on a control cycle), but can alternatively execute responsive to occurrence of a predetermined event and/or at any other suitable time. The control loop preferably runs at a higher frequency than the local control system and/or the AI agent, but can alternatively run at the same or lower frequency. The control loop is preferably a legacy control loop (e.g., one that was previously used with the local control system), but can additionally or alternatively be a new control loop. The control loop preferably execute locally (e.g., in the industrial system), but can additionally or alternatively execute remotely, and/or at any other suitable location. The system preferably retrofits the industrial system without replacing or supplanting any of the preexisting control loops, but can alternatively replace one or more of the legacy control loops.

However, the system can include any other suitable set of elements.

4. Method

In variants, as shown in FIG. 4, the method for industrial process control can include: determining AI setpoint values S100; determining local setpoint values S200; selecting a setpoint source S300; optionally determining a set of transition setpoint values S400; and limiting the setpoint values S500; wherein the industrial system is operated based on the limited setpoint values S600. The method functions to determine effective setpoint values for industrial system control within the safety boundaries of the industrial system.

All or portions of the method can be performed in real time (e.g., responsive to a request), iteratively (e.g., for each control cycle, for each timestep, etc.), concurrently, asynchronously, periodically, and/or at any other suitable time. All or portions of the method can be performed automatically, manually, semi-automatically, and/or otherwise performed.

All or portions of the method can be performed using the system described above, but can additionally or alternatively be performed using any other suitable: set of AI agents, setpoint source selectors, limit modules, industrial systems, and/or any other suitable system.

Determining AI setpoint values S100 functions to determine a setpoint that can improve industrial system performance (e.g., efficiency, stability, cost, etc.). In variants, this can function to determine a probabilistic or non deterministic value for the setpoint (e.g., using probabilistic or non deterministic methods). The resultant agent setpoint values can be provided to the local control system, to the setpoint source selector, to the transition function, to the limit module, to the control loop, and/or to any other suitable platform or industrial system module.

S100 can be performed: for each control cycle, for every N control cycles, when the AI agent is selected as the setpoint source (e.g., while the AI agent is selected as the setpoint source, each time the AI agent is selected as the setpoint source, etc.), when a predetermined event occurs, and/or at any other suitable time. S100 is preferably iteratively repeated, but can alternatively be performed once, a limited number of times, and/or any other suitable number of times. S100 can be performed at the same frequency as S200 (e.g., synchronously with S200), asynchronously from S200, and/or at any other suitable temporal relationship to S200.

The AI setpoint values are preferably determined for a set of industrial system setpoints, wherein the setpoint set can be: manually defined, determined based on the setpoint set controlled by the local control system, be predefined (e.g., based on the set of equipment used in the industrial system), and/or otherwise defined. S100 can be performed for each individual setpoint, a set of setpoints (e.g., wherein an iteration of S100 determines values for multiple setpoints), and/or any other suitable set of setpoints at the same or different times.

S100 is preferably performed by the AI agent, more preferably a reinforcement learning agent (e.g., constrained RL agent, model-based RL agent, constrained model-based RL agent, etc.), but can additionally or alternatively be performed by an optimization module, other machine learning agents, and/or any other suitable set of modules.

S100 is preferably performed based on the industrial system state (e.g., the system state, the industrial system state from a sliding time window, etc.), but can additionally or alternatively be performed based on a fallback value, manual value, and/or any other suitable information.

In a first variation, S100 includes determining a set of setpoints using one or more AI models, given the industrial system state and a set of AI constraints.

In a first embodiment of the first variation, S100 includes selecting or predicting setpoint values for each of the setpoint set using a learned policy, based on the industrial system state values. The policy can be learned from historical industrial system data (e.g., historical state-setpoint value-response tuples), simulated data (e.g., generated using a learned industrial system model), and/or other data. The policy can be learned using a set of reward and/or cost functions, which can be predetermined, determined based on the AI constraints, determined based on the performance metric (e.g., to be optimized, minimized, maximized, maintained, etc.), learned (e.g., from historical data), and/or otherwise determined. The policy can select from a set of feasible setpoint values for each setpoint, wherein the feasible set can be constrained using a set of AI constraints, manually defined, and/or otherwise defined. The set of AI constraints can be on the setpoint values themselves, on industrial system state variables (e.g., on the effect of using the setpoint value, on the industrial system response to using the setpoint value), and/or on any other suitable parameter. The feasible set can be constrained using: predictive constraints, sequential constraints (e.g., that impose a larger penalty for each successive violation), a thresholded constraint (e.g., wherein setpoint values that result in an industrial system state threshold violation can be used for industrial system control, but setpoint values that move the industrial system state beyond the threshold and closer to a constraint are removed), and/or any other suitable constraint.

In variants, the AI agent can optionally explore the feasible action space or set of candidate setpoint values (e.g., to determine new combinations of setpoint values, to expand the training data distribution, etc.) in an "exploration" mode or state, wherein the AI agent can use an epsilon greedy approach, Boltzmann exploration, optimistic exploration, and/or any other exploration approach.

In a second embodiment of the first variation, the AI agent can generate one or more candidate sets of setpoint values, wherein the candidate sets of setpoint values can be filtered (e.g., pruned) based on the AI constraints. For example, candidate setpoint value sets that violate hard constraints (e.g., result in impermissible industrial system state values) can be removed.

In a third embodiment of the first variation, S100 includes generating a setpoint using a reinforcement learning agent based on the industrial system state; and, when a constraint is violated, outputting the fallback value for the setpoint for up to a predetermined number of consecutive constraint violations. A constraint can be violated when: a soft constraint is violated (e.g., surpassed), the AI model is constrained (e.g., the search space is so constrained that less than a threshold number of actions are available for selection by the AI model), and/or when any other suitable constraint violation event occurs.

In a second variation, S100 includes determining a set of setpoints using constrained optimization of a set of target metrics (e.g., efficiency, energy consumption, cost, etc.). This can be performed using Lagrange multipliers, penalty methods, linear programming, integer linear programming, quadratic programming, sequential quadratic programming, branch and bound, Monte Carlo tree searches, and/or any other suitable method.

However, S100 can be otherwise performed.

In variants, the method can optionally include determining an AI agent state S120, which functions to determine a state that characterizes AI agent operation (e.g., whether the AI setpoint values can be trusted or should be used). S120 is preferably performed in parallel with S100, but can alternatively be performed after S100, throughout S100, before S100, and/or at any other suitable time. Alternatively, S120 can be S100. The determined AI agent state is preferably associated with and/or sent with the AI setpoint values to the industrial system module(s), but can alternatively be sent before the AI setpoint values, be used to determine whether the AI setpoint values should be sent (e.g., do not send when the AI agent is unstable or constrained, etc.), or otherwise used. S120 can be performed by the AI agent, by a state module, and/or by any other suitable module. S120 is preferably performed by a module executing in the same computing system as the AI agent, but can alternatively be performed by module that is local to the industrial system.

In a first variant, S120 includes determining the AI agent state based on the AI agent inputs and/or the search space. This can be performed using a set of conditionals, heuristics, or rulesets, and/or other analyses. For example, the AI agent state can be "constrained" when the feasible set of setpoint values includes less than a threshold number or no setpoint values. In another example, the AI agent state can be "unstable" when sequentially predicted setpoint values vary by more than a threshold amount. In another example, the AI agent state can be "unreliable" when the industrial system state used to determine the AI setpoint values was bad (e.g., missing data, includes anomalous values, etc.). However, the AI agent state can be otherwise determined by analyzing the AI agent inputs and/or search space.

In a second variant, S120 includes determining the AI agent state based on the agent operation mode. For example, the AI agent state can be "exploring", "optimizing" (e.g., "exploiting"), based on the respective AI agent mode.

In a third variant, S120 includes determining the AI agent state based on the AI setpoint values. For example, the AI agent state can be determined to be unusable if one or more of the setpoint values violate a constraint (e.g., hard constraint). In another example, the AI agent state can be assigned a weight based on the number and severity of setpoint values that violate the constraints for their respective setpoints (e.g., the AI agent is given lower weight as a setpoint source when more constraint violations exist).

However, the AI agent state can be otherwise determined.

Determining local setpoint values S200 functions to determine fallback setpoint values using the legacy, deterministic setpoint determination method(s).

S200 can be performed contemporaneously with S100, in parallel with S100, for each control cycle, for every L control cycles (e.g., wherein L can be the same as, higher, or lower than N), when the local control system is selected as the setpoint source (e.g., while the local control system is selected as the setpoint source, each time the local control system is selected as the setpoint source, when the AI agent is not selected as the setpoint source, etc.), when a predetermined event occurs, and/or at any other suitable time. S200 is preferably iteratively repeated, but can alternatively be performed once, a limited number of times, and/or any other suitable number of times.

The local setpoint values are preferably determined for a set of industrial system setpoints, wherein the setpoint set can be: manually defined, determined based on the setpoint set controlled by the local control system, be predefined (e.g., based on the set of equipment used in the industrial system), and/or otherwise defined. S200 preferably determines local setpoint values for the same setpoint set as S100, such that each setpoint in the setpoint set can be concurrently associated with an AI setpoint value and a local setpoint value, but can alternatively determine local setpoint values for a different setpoint set than S100 (e.g., control different setpoints, different components, different component hierarchies, etc.). S200 can be performed for each individual setpoint, a set of setpoints (e.g., wherein an iteration of S200 determines values for multiple setpoints), and/or any other suitable set of setpoints at the same or different times.

S200 is preferably performed by the local control system (e.g., executing locally at the industrial system), more preferably the legacy local control system, but can additionally or alternatively be performed by a deterministic control system, a secondary ML-based control system, and/or any other suitable control system.

S200 is preferably performed based on the industrial system state (e.g., the system state, the industrial system state from a sliding time window, etc.), but can additionally or alternatively be performed based on a fallback value, manual value, and/or any other suitable information. The industrial system state used by S200 is preferably the same as the industrial system state used by S100, but can alternatively be a subset of the industrial system state used by S100, a superset of the industrial system state used by S100, share some parameters with the industrial system state used by S100, and/or be otherwise related to the industrial system state used in S100.

S200 can also be performed using a set of local constraints or be performed without the set of local constraints (e.g., wherein the constraints are implicitly or explicitly hard-coded into the local control system). The local constraints can be the same as the set of AI constraints, but can alternatively be different (e.g., include different constraint values, constrain setpoint values instead of industrial system state values, constrain different setpoint values, constrain different industrial system state variables, etc.).

In an illustrative example, the building management system can use a set of pre-programmed settings, predictive maintenance, demand response programs, and/or other methods to determine the local values for the set of setpoints.

However, S200 can be otherwise performed.

Selecting a setpoint source S300 functions to select a controlling setpoint source for control loop use. S300 can be performed (e.g., the controlling setpoint source can be selected for): every control cycle, one or more control cycles in advance (e.g., of the current cycle), periodically (e.g., every S cycles), randomly, when a selection event occurs (e.g., one or more of the industrial system and/or platform state transitioning from stable to unstable, or transitioning from unstable to stable, etc.), at a lower frequency than setpoint determination (e.g., there is a longer window between source selections); at a higher frequency than setpoint determination; when the AI agent state has been a selectable state for a threshold amount of time, and/or at any other suitable time. For example, the controlling setpoint source can be used to dictate the setpoint values for multiple control cycles after selection.

S300 is preferably performed after S120 and independently of S100, but can alternatively be performed after S100 (e.g., wherein the setpoint source is selected based on the source's setpoint values), after S200, and/or at any other suitable time.

S300 is preferably performed by a setpoint source selector, but can alternatively be performed manually (e.g., an operator manually overrides the automatically-selected setpoint source), by the local control system, and/or otherwise performed. The system can include a single setpoint source selector for all setpoints, a different setpoint source selector for each setpoint or set thereof (e.g., for similar types of setpoints, for all setpoints within a subsystem, etc.), and/or any other suitable number of setpoint source selectors for any other suitable set of setpoints. The setpoint source selector can be local to the industrial system (e.g., be part of the local control system, be a separate module from the local control system, etc.), remote from the industrial system, or otherwise executed.

S300 can be performed using: a set of rules, a set of heuristics, a machine learning model (e.g., foundation model, reinforcement learning agent, neural network, etc.), a set of probabilities, and/or any other suitable model.

In a first variation, S300 includes selecting the setpoint source (example shown in FIG. 2), wherein the setpoint(s) output by the selected setpoint source is used as the effective setpoint. The setpoint source can be selected from: the AI agent, the local control system, a user (e.g., manual source), a default store, and/or any other suitable source. In this variation, S300 can determine which setpoint source is more reliable, safer, and/or trusted, optionally independent of the setpoint values themselves (e.g., the setpoint source is selected without knowledge of the respective setpoint values).

The setpoint source is preferably selected based on the AI agent state, without considering the AI setpoint values, but can additionally or alternatively be selected based on the industrial system state, based on the local control system state, based on the AI setpoint values, based on the local control values, the communication state between the remote and local systems, and/or based on any other suitable data. Selecting the setpoint source without considering the setpoint values can be faster than setpoint source selection based on the setpoint values, since fewer values need to be evaluated. This can enable the setpoint source to be selected before the associated setpoint values are invalidated (e.g., because the industrial system state has deviated too far beyond the industrial system state that was used to determine the setpoint values).

In a first embodiment, S300 preferentially selects the AI agent when the AI agent is in a selectable state (e.g., stable, unconstrained, using reliable industrial system data, in an exploration mode, in an exploitation mode, has a prediction quality higher than a threshold, etc.) and falls back on the local control system, default setpoint values, or other default control system when the AI agent is not in a selectable state (e.g., is unstable, has lost connection with the industrial system or is disconnected, is AI constrained, has a platform error, is using unreliable industrial system state data, has a prediction quality less than a threshold, etc.). When the industrial system is operating under manual control, S300 can select manual entry as the controlling setpoint source.

In a second embodiment, S300 selects the setpoint source based on the industrial system state. For example, S300 can select the AI agent as the controlling setpoint source when the industrial system state is stable, and fall back on the local control system when the industrial system state is unstable or nearing a constraint.

In a third embodiment, S300 selects the setpoint source based on the setpoint values. For example, S300 can select the setpoint source based on the respective setpoint value set's severity of constraint violations. In an illustrative example, the AI agent is selected when the AI setpoint values only violate soft constraints or do not violate constraints. In another illustrative example, the local control system is selected when fewer local setpoint values violate constraints than the AI setpoint values. In a second example, S300 can select the setpoint source based on whether the respective setpoint value set violates constraint violations. In a third example, S300 can select the setpoint source based on how close the setpoint values are to the hard constraints (e.g., select a setpoint source further from the hard constraint).

In a fourth embodiment, S300 can use a combination of the above. For example, the sources can be scored based on whether they would be selected based on each embodiment, wherein different embodiments can be weighted differently (e.g., based on importance), and the source with the highest score can be selected. In another example, the embodiments can be hierarchically prioritized, wherein setpoint sources that fail a lower-level embodiment can still be selected if they satisfy a higher-level embodiment. In another example, the embodiments can be combined. In an illustrative example, the AI agent can be selected only if the AI agent is in a selectable state and the industrial system state is stable. In another example, embodiments can be excluded. In an illustrative example, setpoint source selection is performed without considering setpoint values.

However, S300 can otherwise select the setpoint source.

In a second variation, S300 includes selecting the setpoint value itself (example shown in FIG. 3), wherein the selected setpoint value is used as the effective setpoint value. In this variant, S300 can determine which setpoint value is best (e.g., most optimal, best satisfies the operation target, etc.), optionally independent of the setpoint source (e.g., the setpoint value is selected without knowledge of the respective setpoint source). The effective setpoint value can be selected from: the AI setpoint values (e.g., generated by the AI agent, in S100, etc.), the local setpoint values (e.g., generated by the local control system, in S200, etc.), a predetermined setpoint value (e.g., a default value, a constant value, etc.), a manually specified value, and/or any other suitable set of setpoints. In a first embodiment, the values for all setpoints output by the selected setpoint source are used as the effective setpoint values. In a second embodiment, different setpoint sources are selected for different setpoints, wherein the value output by the selected setpoint source is used as the effective setpoint for that setpoint.

However, S300 can otherwise determine the effective setpoint source or setpoint values.

In an example, S300 can select (e.g., fall back on) the local control system as the setpoint source when the AI agent is over-constrained, when the system is unstable (e.g., for more than a threshold number of control cycles), when a predetermined safety event occurs (e.g., a high severity event occurs), when a manual override is received, and/or when any other suitable fallback condition is met, and can select the AI agent as the setpoint source in all other situations. System stability can be determined based on: industrial system state, AI agent state, platform state, and/or any other suitable information (e.g., example shown in FIG. 2). System stability can be determined using a set of rules or checks, using a set of industrial system constraints (e.g., wherein the system is unstable when the industrial system component's operation exceeds the constraints, such as when the distribution chilled water supply rises above 40° F. (adj.) for 30 minutes (adj.)), when the industrial system does not output a desired output for a predetermined amount of time (e.g., wall clock time, number of cycles, etc.), when the connection health (e.g., determined using connection monitoring) fails, when the industrial system is disconnected from the platform or AI agent, when a predetermined amount of time (e.g., wall clock time, number of control cycles) has passed since the last transition to an unstable state and/or transition to a different setpoint source (e.g., 60 minutes, 90 minutes, etc.), and/or otherwise determined. The fallback conditions can be: default conditions, user-specified, and/or be otherwise determined.

However, S300 can be otherwise performed.

The method can optionally include determining a set of transition setpoint values S400, which functions to smooth the transition between a starting setpoint value and a target setpoint value.

The set of transition setpoints are preferably treated as the effective setpoint values provided to the industrial system for execution, but can be otherwise used. In an example, each successive transition setpoint value in the set is executed for each sequential control cycle. The set of transition setpoint values can be provided to the control loop: sequentially (e.g., one by one), as a set (e.g., as a time-ordered set), and/or in any other suitable manner. The set of transition setpoint values preferably include a time series of setpoint values (e.g., one setpoint value for each control cycle, for each predetermined timestep, etc.), but can alternatively include an equation (e.g., an equation interpolating between the current setpoint value and effective setpoint value, etc.) or be otherwise configured.

S400 is preferably performed for every setpoint, but can additionally or alternatively be performed for setpoints that have different values specified by the controlling setpoint source, for a subset of setpoints, and/or for any other set of setpoints.

The starting setpoint values are preferably the current setpoint values (e.g., prior setpoint value), but can additionally or alternatively be a prior target setpoint value, a future setpoint value (e.g., that will be executed), and/or any other suitable setpoint value.

The target setpoint values are preferably the setpoint values determined by the controlling setpoint source (e.g., selected using S300), but can additionally or alternatively be a previously-selected setpoint (e.g., from the last transition), or any other suitable setpoint value. The target setpoint values can be from the same setpoint source or from different setpoint sources.

S400 can be performed: when a transition between setpoint values occurs; continuously; when the difference between the setpoint values exceeds a threshold difference; when a new setpoint source is selected; when a new setpoint value is determined and/or at any other suitable time. S400 can be performed: once when the new setpoint value is determined, until the effective setpoint value is met, when another transition occurs, or when any other suitable condition is met. S400 is preferably performed for each setpoint, but can additionally or alternatively be performed for a set of setpoints, for a subset of setpoints, and/or for any other suitable setpoint. S400 can be performed using a transition module and/or any other suitable module. The transition module can be part of the industrial system (e.g., part of the local control system, separate from the local control system, etc.), remote from the industrial control system, and/or otherwise arranged.

The set of transition setpoints can be determined using: a stepwise method (e.g., wherein the setpoint value is adjusted by a predetermined increment or step), linear interpolation, polynomial interpolation, and/or using any other suitable method.

In a first variant, S400 determines a set of transition setpoint values for each of a plurality of future timesteps, and does not recalculate the transition setpoint values during those future timesteps. The future timesteps can span a time window defined by the setpoint values (e.g., wherein the setpoint values can be associated with a time window in which they should be effected), a standard time window for the setpoint, and/or any other suitable time window.

In a second variant, S400 iteratively determines a set of transition setpoint values for the next timestep, based on a prior setpoint value, a current setpoint value, and/or a future setpoint value.

However, S400 can be otherwise performed.

S400 can optionally set transition priorities for different setpoints (e.g., set a transition order for different setpoints). The transition priorities can be determined: manually, automatically (e.g., based on setpoint dependencies, dependencies between the systems associated with the setpoints, based on physics models, etc.), and/or otherwise determined. Different transition directions (e.g., increasing vs. decreasing) can have the same or different transition priorities. For example, if the number of chillers is staging up, the Chiller Run/Stop Command can be transitioned after the pump and tower setpoints have been transitioned. Alternatively, if the number of chillers is staging down, the Chiller Run/Stop Command can be transitioned before the pump and tower setpoints have been transitioned.

However, S400 can be otherwise performed.

Limiting the setpoint values S500 functions to ensure that the setpoint provided to the control loop is within the safety boundaries of the industrial system (e.g., within the local constraints of the industrial system). This can ensure that: the effective setpoint values is within a permitted range of values, ensure that the effective setpoint values(s) align with a predetermined set of criteria (e.g., specified by the operator, by an optimization, etc.), ensure that the effective setpoint values(s) will not cause undesired effects, and/or perform other functionalities. This can be particularly advantageous when the effective setpoint values are determined by a probabilistic system, such as the AI agent, and/or when setpoint sources are selected based on the overall operation state, not based on the setpoint values themselves. The setpoint value that is limited can be: the AI setpoint value, the transition setpoint value(s), the local setpoint value, and/or any other suitable effective setpoint value. The setpoint values are preferably limited using a set of local constraints, which can be the same as or different from the AI constraints and/or the local constraints used by the local control system. The local constraints are preferably on the setpoint values themselves, but can additionally or alternatively be on the predicted industrial system state, or based on any other suitable parameter.

In a first example, S500 is only performed on setpoint values sourced from the AI agent. In a second example, S500 is performed on setpoint values sourced from all or a subset of the available setpoint sources (e.g., AI agent, local control system, manual entry, etc.). In a third example, S500 is performed on the transition setpoint value(s).

S500 can be performed every control cycle, before the effective setpoint is sent to the control loop, for every new effective setpoint value, and/or at any other suitable time. S500 is preferably performed local to the industrial system (e.g., to prevent a man-in-the-middle attack), but can alternatively be performed remote from the industrial system, wherein the limited setpoint is sent to the industrial system.

S500 is preferably performed by the limit module, but can be performed by any other suitable module. The limit module can be deployed manually (e.g., by a trusted user), via an encrypted connection, and/or otherwise deployed. S500 can be performed using: a set of rules, heuristics, criteria, conditions, specification details, default values, and/ or any other suitable deterministic method; alternatively, S500 can be performed using a probabilistic method (e.g., an explainable probabilistic method). For example, S500 can include a set of checks for each setpoint to ensure that the effective setpoint value falls between the minimum and maximum values for a given setpoint. When the setpoint fails the check, the setpoint can be corrected (e.g., to the minimum or maximum value, whichever closer; to a default value; to a setpoint value from a different setpoint source; to a prior value for the setpoint; etc.), a notification can be sent to the operator, and/or other actions can be taken.

In variant, S500 can include: receiving a controlling setpoint value (e.g., setpoint value from the selected setpoint source, transition setpoint value from the transition module, etc.); evaluating whether the setpoint value violates the setpoint's constraints; using the setpoint value for industrial system control when the constraints are satisfied; and not using the setpoint value for industrial system control when the constraints are violated. The setpoint values can be used or failed: as a set, individually, and/or otherwise used or failed.

However, S500 can be otherwise performed.

Operating the industrial system based on the limited setpoint values S600 functions to control industrial system operation using setpoint values that have passed multiple layers of safety checks (e.g., constraints). S600 is preferably performed after S500, but can additionally or alternatively be performed after (e.g., immediately after) S200, S300, S400, and/or any other suitable step. S600 is preferably performed each control cycle, but can alternatively be performed throughout multiple control cycles, and/or at any other suitable time. S600 is preferably performed using the limited setpoints from S500, but can alternatively be performed using the setpoint values from the controlling setpoint source selected in S300, the transition setpoint values determined in S400, and/or using any other suitable setpoint. S600 can additionally or alternatively be performed using the process variable values from the industrial system subsystems and/or components, the industrial system state, and/or any other suitable industrial system information. S600 is preferably performed by the industrial system's pre-existing control loop(s), but can additionally or alternatively be performed by a new control loop and/or by any other suitable control loop. In operation, the control loop generates a set of operation instructions and/or a set of internal setpoints for each of a set of industrial system components (e.g., collectively forming the industrial subsystem associated with the effective setpoint), wherein the industrial system components are controlled according to the set of operation instructions (and/or set of internal setpoints). Industrial system component operation can generate an updated industrial system state, which can be provided back to the AI agent and/or local control system for subsequent setpoint determination.

However, S600 can be otherwise performed.

SPECIFIC EXAMPLES

Specific Example 1. A system for industrial system control, comprising: an AI agent executing remotely from the industrial system and configured to determine AI-derived setpoint values for a set of setpoints of an industrial system; a setpoint source selector executing locally within the industrial system and configured to select a target setpoint source from a group comprising the AI agent and a local control system of the industrial system configured to determine local setpoint values for the set of setpoints; a transition module executing locally within the industrial system and configured to generate timeseries of setpoint values between a current setpoint value and a setpoint value determined by the target setpoint source; and a limit module executing locally within the industrial system, wherein the limit module is configured to constrain an upcoming setpoint value from the timeseries of setpoint values using a predetermined set of constraints; wherein components of the industrial system are controlled based on the constrained upcoming setpoint value.

Specific Example 2. The system of Specific Example 1, wherein the AI agent comprises a constrained reinforcement learning agent.

Specific Example 3. The system of Specific Example 1, wherein the AI agent predicts setpoint values from a feasible set of candidate setpoint values, wherein the feasible set of candidate setpoint values is unpruned while a current industrial system data value is below a threshold, and is pruned based on the set of AI constraints when the current industrial system data value exceeds the threshold.

Specific Example 4. The system of Specific Example 1, wherein the AI agent comprises a reinforcement learning agent and learns a policy to predict a setpoint value from a feasible set of candidate setpoint values defined by a cost-based constraint function, determined based on a set of industrial system constraints, and a cost threshold.

Specific Example 5. The system of Specific Example 1, wherein the setpoint source selector selects the setpoint source without considering the AI-derived setpoint values.

Specific Example 6. The system of Specific Example 1, wherein the components comprise at least one of a chiller, evaporator, cooling tower, hot thermal energy storage, or cold energy storage, wherein the setpoint set comprises at least one of a temperature, pressure, or flow rate for a component.

Specific Example 7. The system of Specific Example 1, wherein the setpoint source selector selects the target setpoint source based on a state of the AI agent Specific Example 8. The system of Specific Example 7, wherein the state of the AI agent is determined by the remote computing system and sent to the industrial system for setpoint source selector evaluation.

Specific Example 9. The system of Specific Example 7, wherein the state of the AI agent comprises whether the set of setpoint values violate an AI constraint.

Specific Example 10. The system of Specific Example 7, wherein the state of the AI agent comprises a prediction quality of the AI agent.

Specific Example 11. The system of Specific Example 7, wherein the state of the AI agent comprises whether the AI agent is in an exploration state or an exploitation state.

Specific Example 12. The system of Specific Example 7, wherein the state of the AI agent comprises an AI agent determination of whether data from the industrial system fails a predetermined set of conditions.

Specific Example 13. The system of Specific Example 1, wherein the AI agent determines the AI-derived set of setpoint values by: learning a dynamic model of the industrial system based on historical industrial system states, historical actions, and historical reward values representing effects of each historical setpoint value, given the historical state, on a metric of the industrial system; learning a policy based on the dynamic model, wherein the policy comprises a softmax function of the reward values for a setpoint value-state pair; and predicting the AI-derived setpoint values using the policy.

Specific Example 14. A method for industrial system control, comprising: at a remote computing system: determining artificial intelligence (AI)-derived setpoint values for a set of setpoints of the industrial system using an AI agent; and determining a state of the AI agent; at the industrial system: determining local setpoint values for the set of setpoints using a local control system; using a setpoint source selector, dynamically selecting a selected setpoint source from one of the local control system or the AI agent based on the state of the AI agent received from the remote computing system; and using a local limit module, verifying that the setpoint values from the selected setpoint source are within a set of local constraints after selecting the selected setpoint source, wherein components of the industrial system are operated based on the setpoint values determined by the selected setpoint source after verification.

Specific Example 15. The method of Specific Example 14, further comprising: at the industrial system, determining a set of transition setpoints between a current setpoint and a target setpoint from the setpoint set using a transition model, wherein the local limit module verifies an upcoming transition setpoint before the upcoming transition setpoint is used for industrial system component operation.

Specific Example 16. The method of Specific Example 14, wherein the AI agent comprises a constrained model-based reinforcement learning agent that determines the AI-derived setpoint values based on a set of AI constraints.

Specific Example 17. The method of Specific Example 14, wherein the AI agent comprises a reinforcement learning agent that predicts setpoint values from a feasible set of candidate setpoint values, wherein the feasible set of candidate setpoint values is unpruned while a current industrial system data value is below a threshold, and is pruned based on the set of AI constraints when the current industrial system data value exceeds the threshold.

Specific Example 18. The method of Specific Example 14, wherein the set of remote constraints comprise predictive constraints.

Specific Example 19. The method of Specific Example 14, wherein the
AI agent predicts setpoint values using restorative inductive priors.

Specific Example 20. The method of Specific Example 14, wherein the local control system is selected as the target setpoint source when the state of the AI agent is unstable, wherein the AI agent is unstable when the AI agent determines that a setpoint value for the set of setpoints violates an AI constraint.

Specific Example 21. The method of Specific Example 20, wherein the AI agent is unstable when the AI agent determines that a set of industrial system data fails a predetermined set of conditions.

Specific Example 22. A redundant setpoint safety system for an industrial system, comprising: first layer comprising a primary set of constraints, wherein an AI agent is configured to predict a set of AI-derived values for an industrial system setpoint set based on the primary set of constraints; a second layer comprising a setpoint source selector executing locally on the industrial system and configured to select the AI agent as a target setpoint source when a state of the AI agent is within a predetermined range, and fall back on a local control system when the state is outside of the predetermined range, wherein the local control system is configured to determine default values for the industrial system setpoint set; and a third layer comprising a limit module executing locally on the industrial system and configured to limit values from the target setpoint source to a predetermined set of values; wherein components of the industrial system are controlled based on the limited values for the industrial system setpoint set.

Specific Example 23. A method for industrial system control, comprising: receiving an AI agent state associated with set of AI-derived setpoint values from a remote AI agent; determining whether to use setpoint values from the AI agent or setpoint values from a local control system, wherein both the AI agent and the local control system determine values for a shared set of setpoints; and wherein the set of AI derived setpoint values are used for industrial system component control when the AI agent is selected, and wherein setpoint values from the LCS are used for industrial system component control when the LCS is selected.

Specific Example 24. The technology of any of the above Specific Examples, wherein the AI agent is executed on a cloud platform that is communicatively connected to the industrial system using an Internet connection.

Specific Example 25. The technology of any of the above Specific Examples, wherein the AI-derived set of setpoint values comprises values for at least one future timestep.

Specific Example 26. The technology of any of the above Specific Examples, wherein the local control system is configured to determine setpoint values for the same set of setpoints as the AI agent.

Specific Example 27. The technology of any of the above Specific Examples, wherein the local setpoint values and the AI-derived setpoint values are determined based on a same set of data from the industrial system.

Specific Example 28. The technology of any of the above Specific Examples, wherein the AI agent comprises a reinforcement learning agent Specific Example 29. The technology of any of the above Specific Examples, further comprising receiving industrial system response data after operating the industrial system based on the setpoint set from the target setpoint source, wherein the AI agent is retrained based on the setpoint set and the industrial system response data.

Specific Example 30. The technology of any of the above Specific Examples, wherein the target setpoint source is selected for each timestep Specific Example 31. The technology of any of the above Specific Examples, wherein the target setpoint source is selected for each setpoint Specific Example 31. The technology of any of the above Specific Examples, wherein a feasible set of candidate setpoint values for a setpoint is defined by a cost-based constraint function and a cost threshold within the AI agent, Specific Example 32. The technology of any of the above Specific Examples, wherein the AI agent learns a setpoint value selection policy, using the cost-based constraint functions for the set of setpoints, to select a setpoint value from the feasible set of candidate setpoint values.

Specific Example 33. The technology of any of the above Specific Examples, wherein the setpoint source selector is configured to select the local control system as the target setpoint source when the AI agent is unstable and select the AI agent as the target setpoint source when the AI agent is stable.

Specific Example 34. The technology of any of the above Specific Examples, wherein the AI agent predicts the set of AI-derived setpoint values using a set of hard and soft constraints.

All references cited herein are incorporated by reference in their entirety, except to the extent that the incorporated material is inconsistent with the express disclosure herein, in which case the language in this disclosure controls.

Optional elements in the figures are indicated in broken lines.

Different processes and/or elements discussed above can be defined, performed, and/or controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be manually defined, be custom instructions, be standardized instructions, and/or be otherwise defined. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements (and/or variants thereof) discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A system for industrial system control, comprising:
an artificial intelligence (AI) agent, comprising a machine learning model, executing remotely from the industrial system and configured to determine AI-derived setpoint values for a set of setpoints of an industrial system;
a setpoint source selector, comprising a set of selection logic, executing locally within the industrial system and configured to select a target setpoint source from a group comprising the AI agent and a local control system of the industrial system configured to determine local setpoint values for the set of setpoints, wherein the setpoint source selector selects the target setpoint source based on a state of the AI agent, wherein the state of the AI agent comprises whether the AI agent is in an exploration state or an exploitation state;
a transition module, comprising a set of interpolations, executing locally within the industrial system and configured to generate timeseries of setpoint values between a current setpoint value and a setpoint value determined by the target setpoint source; and a limit module, comprising a set of local constraints, executing locally within the industrial system, wherein the limit module is configured to constrain an upcoming setpoint value from the timeseries of setpoint values using a predetermined set of constraints;

wherein components of the industrial system are controlled based on the constrained upcoming setpoint value.

2. The system of claim 1, wherein the AI agent comprises a constrained reinforcement learning agent.

3. The system of claim 1, wherein the AI agent predicts setpoint values from a feasible set of candidate setpoint values, wherein the feasible set of candidate setpoint values is unpruned while a current industrial system data value is below a threshold, and is pruned based on the set of AI constraints when the current industrial system data value exceeds the threshold.

4. The system of claim 1, wherein the AI agent comprises a reinforcement learning agent and learns a policy to predict a setpoint value from a feasible set of candidate setpoint values defined by a cost-based constraint function, determined based on a set of industrial system constraints, and a cost threshold.

5. The system of claim 1, wherein the setpoint source selector selects the setpoint source without considering the AI-derived setpoint values.

6. The system of claim 1, wherein the components comprise at least one of a chiller, evaporator, cooling tower, hot thermal energy storage, or cold energy storage, wherein the setpoint set comprises at least one of a temperature, pressure, or flow rate for a component.

7. The system of claim 1, wherein the state of the AI agent is determined by the remote computing system and sent to the industrial system for setpoint source selector evaluation.

8. The system of claim 1, wherein the state of the AI agent comprises whether the set of setpoint values violate an AI constraint.

9. The system of claim 1, wherein the state of the AI agent comprises a prediction quality of the AI agent.

10. A method for industrial system control, comprising:
at a remote computing system:
   determining artificial intelligence (AI)-derived setpoint values for a set of setpoints of the industrial system using an AI agent, wherein the AI agent comprises a reinforcement learning agent that predicts setpoint values from a feasible set of candidate setpoint values, wherein the feasible set of candidate setpoint values is unpruned while a current industrial system data value is below a threshold, and is pruned based on the set of AI constraints when the current industrial system data value exceeds the threshold; and
   determining a state of the AI agent;
at the industrial system:
   determining local setpoint values for the set of setpoints using a local control system;
   using a setpoint source selector comprising a set of selection logic, dynamically selecting a selected setpoint source from one of the local control system or the AI agent based on the state of the AI agent received from the remote computing system; and
   using a local limit module comprising a set of local constraints, verifying that the setpoint values from the selected setpoint source are within the set of local constraints after selecting the selected setpoint source, wherein components of the industrial system are operated based on the setpoint values determined by the selected setpoint source after verification.

11. The method of claim 10, further comprising: at the industrial system, determining a set of transition setpoints between a current setpoint and a target setpoint from the setpoint set using a transition model, wherein the local limit module verifies an upcoming transition setpoint before the upcoming transition setpoint is used for industrial system component operation.

12. The method of claim 10, wherein the AI agent comprises a constrained model-based reinforcement learning agent that determines the AI-derived setpoint values based on a set of AI constraints.

13. The method of claim 10, wherein the set of local constraints comprise predictive constraints.

14. The method of claim 10, wherein the AI agent predicts setpoint values using restorative inductive priors.

15. The method of claim 10, wherein the local control system is selected as the target setpoint source when the state of the AI agent is unstable, wherein the AI agent is unstable when the AI agent determines that a setpoint value for the set of setpoints violates an AI constraint.

16. The method of claim 15, wherein the AI agent is unstable when the AI agent determines that a set of industrial system data fails a predetermined set of conditions.

17. A system for industrial system control, comprising:
an artificial intelligence (AI) agent, comprising a machine learning model, executing remotely from the industrial system and configured to determine AI-derived setpoint values for a set of setpoints of an industrial system, wherein the AI agent predicts setpoint values from a feasible set of candidate setpoint values, wherein the feasible set of candidate setpoint values is unpruned while a current industrial system data value is below a threshold, and is pruned based on the set of AI constraints when the current industrial system data value exceeds the threshold;
a setpoint source selector, comprising a set of selection logic, executing locally within the industrial system and configured to select a target setpoint source from a group comprising the AI agent and a local control system of the industrial system configured to determine local setpoint values for the set of setpoints;
a transition module, comprising a set of interpolations, executing locally within the industrial system and configured to generate timeseries of setpoint values between a current setpoint value and a setpoint value determined by the target setpoint source; and
a limit module, comprising a set of local constraints, executing locally within the industrial system, wherein the limit module is configured to constrain an upcoming setpoint value from the timeseries of setpoint values using a predetermined set of constraints;

wherein components of the industrial system are controlled based on the constrained upcoming setpoint value.

18. The system of claim 17, wherein the setpoint source selector selects the target setpoint source based on a state of the AI agent.

19. The system of claim 18, wherein the state of the AI agent comprises whether the AI agent is in an exploration state or an exploitation state.

20. The system of claim 18, wherein the state of the AI agent comprises an AI agent determination of whether data from the industrial system fails a predetermined set of conditions.

* * * * *